US008715601B2

(12) United States Patent
Makkee et al.

(10) Patent No.: US 8,715,601 B2
(45) Date of Patent: May 6, 2014

(54) DIESEL PARTICULATE CONTROL

(75) Inventors: Michiel Makkee, Rockanje (NL);
Krishna Kamasamudram, Columbus, IN (US); Walter G. Copan, New Fairfield, CT (US)

(73) Assignee: Clean Diesel Technologies, Inc., Ventura, CA (US)

( * ) Notice: Subject to any disclaimer, the term of this patent is extended or adjusted under 35 U.S.C. 154(b) by 413 days.

(21) Appl. No.: 13/150,550

(22) Filed: Jun. 1, 2011

(65) Prior Publication Data
US 2011/0239626 A1 Oct. 6, 2011

Related U.S. Application Data

(62) Division of application No. 11/750,601, filed on May 18, 2007, now Pat. No. 7,964,154.

(51) Int. Cl.
*B01D 53/56* (2006.01)
*B01J 8/02* (2006.01)

(52) U.S. Cl.
USPC ......... 423/213.5; 423/213.2; 60/287; 60/294; 60/299; 60/311

(58) Field of Classification Search
USPC ............ 423/213.2; 44/603; 60/287, 294, 299, 60/311; 422/171, 177, 180
See application file for complete search history.

(56) References Cited

U.S. PATENT DOCUMENTS

| 5,266,083 | A | * | 11/1993 | Peter-Hoblyn et al. | ......... 44/358 |
| 5,758,496 | A | * | 6/1998 | Rao et al. | ......... 60/295 |
| 6,051,040 | A | * | 4/2000 | Peter-Hoblyn | ......... 44/358 |
| 6,203,770 | B1 | * | 3/2001 | Peter-Hoblyn et al. | ....... 423/212 |
| 6,725,653 | B2 | * | 4/2004 | Brown et al. | ......... 60/297 |
| 7,964,154 | B2 | * | 6/2011 | Makkee et al. | ....... 422/171 |
| 2005/0164139 | A1 | * | 7/2005 | Valentine et al. | ......... 431/4 |
| 2007/0006458 | A1 | * | 1/2007 | Jankowski | ......... 29/890 |
| 2007/0089403 | A1 | * | 4/2007 | Pfeifer et al. | ......... 60/286 |

* cited by examiner

*Primary Examiner* — Nina Bhat
(74) *Attorney, Agent, or Firm* — Thaddius J. Carvis

(57) ABSTRACT

A method and apparatus are provided for reducing emissions of particulates from diesel engines. Exhaust is passed through a diesel particular filter having at least two stages comprised of (a) a catalyst section having a platinum group metal catalyst on contact surfaces within the catalyst section and (b) a filter section comprised of passages effective to remove particulates from a moving stream of combustion gases generated by combusting the fuel in the engine and holding them therein to permit their oxidation. Carbon removal is enhanced by utilizing levels of platinum group metal composition, cerium compositions, fuels and/or optional chemical enhancers to generate $NO_2$ in the catalyst section in amounts sufficient to form cerium nitrates in the filter section. The cerium oxide is associated with and maintains dispersion of the platinum in the filter section, and the cerium nitrates are available at the surface and within the soot particles to provide enhanced soot oxidation at a lower balance point.

15 Claims, 16 Drawing Sheets

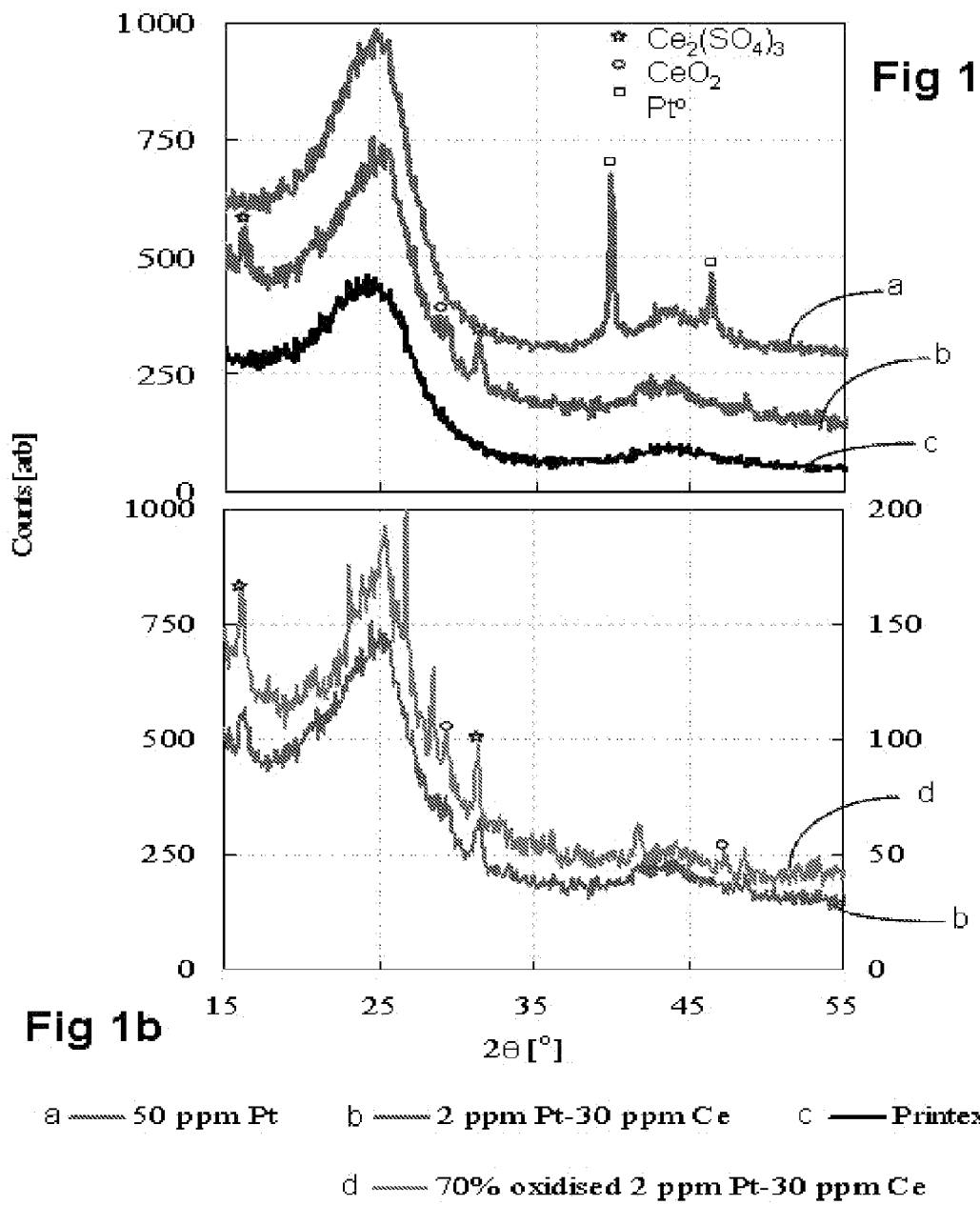

c —— 0 ppm Pt   a —— 50 ppm Pt   f —— 50 ppm Ce   b —— 2 ppm Pt-30 ppm Ce c —— Printex-U  a —— 50 ppm Pt  e —— 44 ppm Fe  b —— 2 ppm Pt-30 ppm Ce

○ CO+2CO2　　■ NO b ——— 2 ppm Pt-30 ppm Ce　　c ——— Printex-U c —— Printex-U  a —— 50 ppm Pt
f —— 50 ppm Ce  b —— 2 ppm Pt-30 ppm Ce

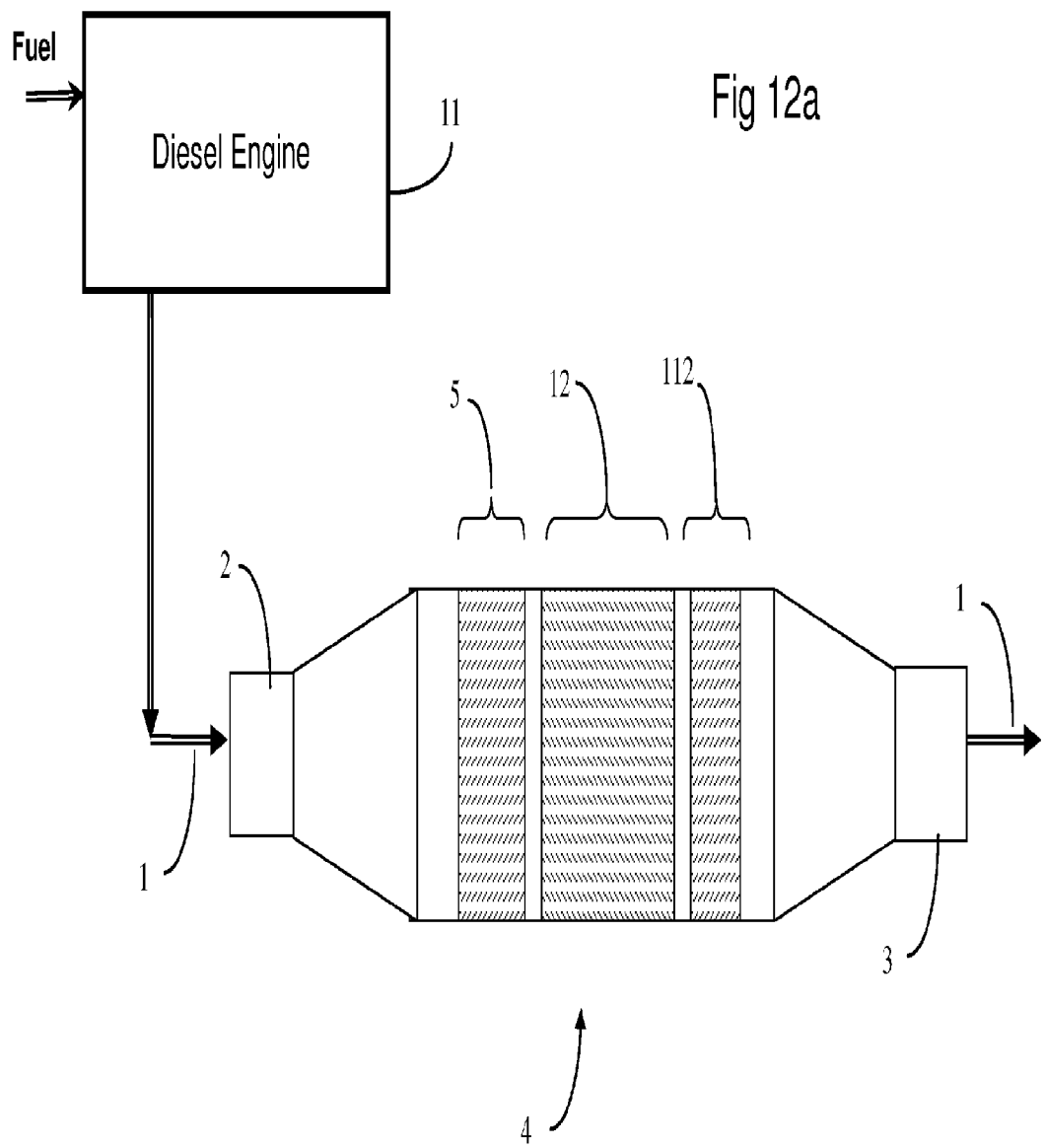

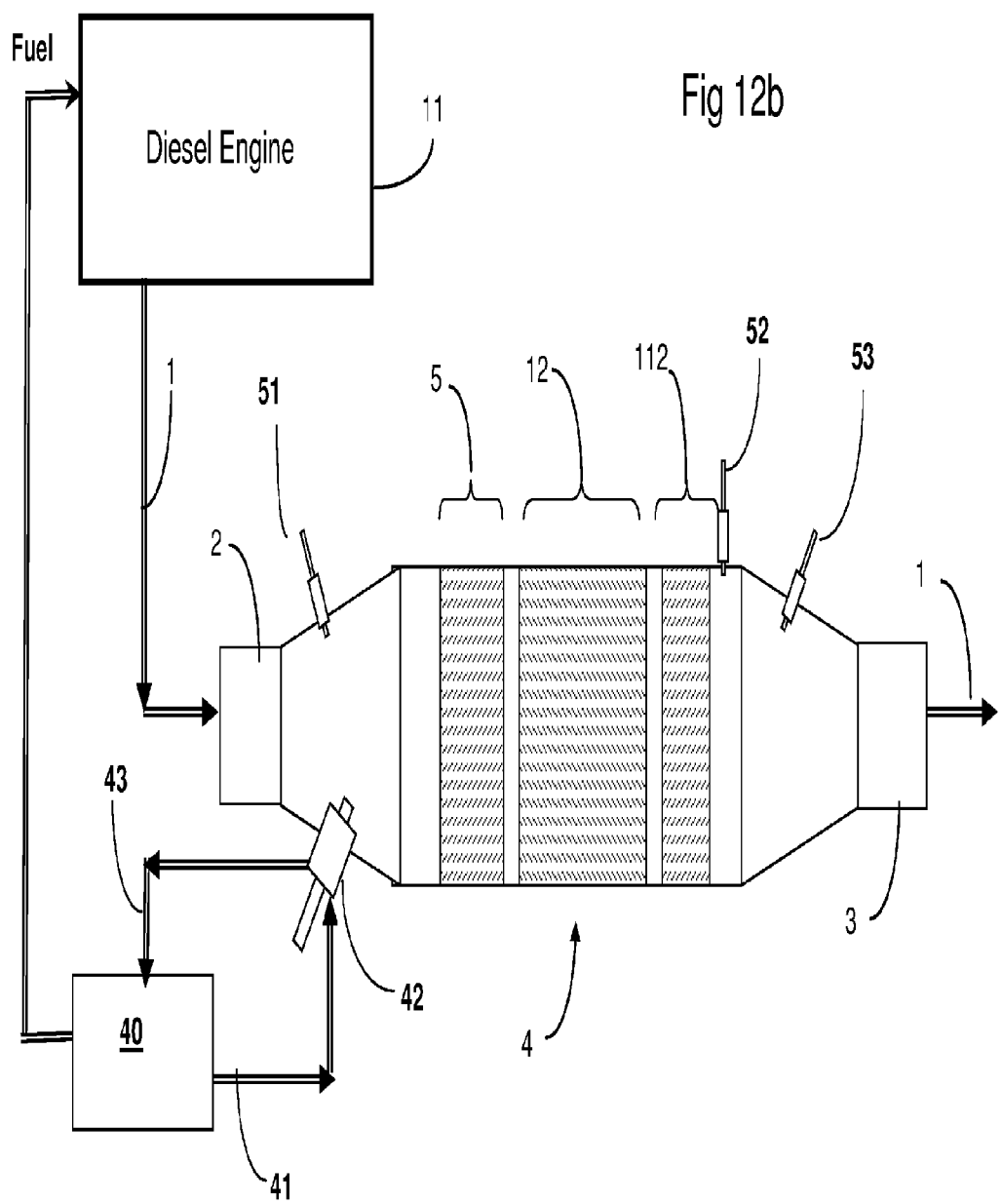

DIESEL PARTICULATE CONTROL

This application is a divisional of U.S. application Ser. No. 11/750,601 filed May 18, 2007, now U.S. Pat. No. 7,964,154.

BACKGROUND OF THE INVENTION

The invention relates to improvements in controlling the emission of particulates from diesel engines and provides methods and apparatus to that end.

Diesel engines are the most preferred for heavy-duty applications and light-duty trucks due to their high torque and superior fuel economy. By virtue of their fuel economy they also result in decreased $CO_2$ emissions as compared to other engines. Unfortunately, diesel engines contribute significantly to urban and global air pollution through the emissions, particularly soot or carbon particulates (PM) and $NO_x$. There is a recognized tradeoff between PM and $NO_x$— when one is decreased, the other tends to increase.

Particulates (soot) can be collected on a filter, and active and passive filter regeneration strategies are being used in practice to burn soot. During most of the diesel engine operation period, the exhaust gas temperatures are below 300° C.—too low for initiating continuous uncatalyzed soot oxidation with $O_2$ or $NO_2$ (See Kimura, K, Alleman, T, L, Chatterjee, S, Hallstrom, K, SAE paper 2004-01-0079, Detroit 2004). However, from energy considerations and system design, an ideal particulate removal unit should minimize the temperature for continuous or induced regeneration of the soot filter.

The use of catalysts has the potential of decreasing the soot oxidation temperature sufficiently to provide for passive trap regeneration. Currently, the two most popular technologies to decrease the necessary temperature for soot oxidation are i) catalyzed soot filters that convert NO to $NO_2$ which in turn oxidizes soot (See R. Allensson, Goersmann, Cavenius, Phillips, Uusimak, A. J, A. P. Walker, SAE paper 2004-01-0072, Detroit 2004), and ii) fuel-borne catalysts, that oxidize soot mainly with $O_2$ as well as to some extent with NO (See T. Campenon, P. Wouters, G. Blanchard, P. Macaudiere, T. Seguelong, SAE paper 2004-01-0071, Detroit 2004). Soot oxidation with oxygen is insignificant in catalyzed soot filters due to the poor contact between catalyst and soot (See J. P. A. Neeft, M. Makkee, J. A. Moulijn, Chemical Engineering Journal 64 (1996) 295). In the catalyzed soot filter applications, the soot is mainly oxidized by $NO_2$, where Pt is one of the primary components which generates significant amounts of $NO_2$ at low temperatures. Unfortunately, catalyzed soot filters lack the desired durability, and the presence of $SO_2$ further leads to sulfate formation (particulates) and deactivation of the catalyzed soot filter.

Diesel particulate filters (DPFs) can be regenerated by either injecting a fuel to increase the temperature of filter or employing an FBC alone. Using a fuel borne catalyst the problem of poor contact between catalyst and soot can be overcome and permit the use of uncatalyzed soot filters to capture and oxidize soot. Depending on the type of fuel borne catalyst used, soot can be oxidized with $O_2$ or with $O_2+NO_2$ (See T. Campenon, P. Wouters, G. Blanchard, P. Macaudiere, T. Seguelong, SAE paper 2004-01-0071, Detroit 2004; S. J. Jelles, R. R. Krul, M. Makkee, J. A. Moulijn, Catalysis Today 53 (1999) 623; and S. J. Jelles, R. R. Krul, M. Makkee, J. A. Moulijn, G. J. K. Acres, J. D. Peter-Hoblyn, SAE 1999-01-0113). The significant advantage of fuel borne catalysts can be realized in the presence of $SO_2$, which do not influence the soot oxidation behavior of the catalyst.

Ce and Ce—Fe fuel borne catalysts oxidize soot mainly by utilizing the 'lattice oxygen' and decrease the soot oxidation temperature by about 100° C. (See T. Campenon, P. Wouters, G. Blanchard, P. Macaudiere, T. Seguelong, SAE paper 2004-01-0071, Detroit 2004). Though enough NO is present in the feed gas, the rate of NO oxidation to $NO_2$ over Ce or Ce—Fe fuel borne catalysts is not efficient and therefore the more powerful oxidant ($NO_2$) cannot be extensively generated, leading to insignificant NO impact on soot oxidation. Bimetallic fuel borne catalysts containing ultra low concentrations of Pt—Ce is shown to decrease the balance point temperature to around 275 to 300° C. (See S. J. Jelles, R. R. Krul, M. Makkee, J. A. Moulijn, Catalysis Today 53 (1999) 623; S. J. Jelles, M. Makkee, J. A. Moulijn, Topics in Catalysis 16 (2001) 269; and S. J. Jelles, R. R. Krul, M. Makkee, J. A. Moulijn, G. J. K. Acres, J. D. Peter-Hoblyn, SAE 1999-01-0113). This is the lowest balance point achieved among the many combinations of fuel additives and catalyzed soot filters studied so far. The additional benefit by using Pt—Ce fuel borne catalyst is that, it forms Pt catalyst coating on the exhaust gas system and on the filter, which is able to significantly oxidize NO to $NO_2$ and therefore further decreasing the balance point temperature. Further advantages of using Pt—Ce fuel borne catalysts include the resistance to sulfur poisoning, even using fuel containing 500 ppm of sulfur, the filter did not suffer from filter plugging or sulfate formation. (See, S. J. Jelles, R. R. Krul, M. Makkee, J. A. Moulijn, Catalysis Today 53 (1999) 623; S. J. Jelles, R. R. Krul, M. Makkee, J. A. Moulijn, G. J. K. Acres, J. D. Peter-Hoblyn, SAE 1999-01-0113; and B. A. A. L. van Setten, M. Makkee, J. A. Moulijn, Catal. Rev. Sci. Eng. 43 (2001) 489) Therefore, Pt—Ce fuel borne catalyst will have significant advantage over catalyzed soot filter like systems where the soot oxidation mainly depends on the generation of $NO_2$ over catalysts which are sulfur sensitive (also, $SO_2$ is oxidized to $SO_3$ very efficiently ultimately leading to the emissions of sulfate PM). Using the ultra low dosage of Pt—Ce (<8 ppm) fuel borne catalyst the frequency of filter cleaning could be reduced significantly due to less ash accumulation.

Recently, diesel soot containing fuel borne ceria catalyst was characterized and a micro kinetic approach was followed to study the impact of the surface oxygen complex (SOC) reactivity with $O_2$ (See L. Retailleau, R. Vonarb, V. Perrichon, E. Jean, D. Bianchi, Energy Fuels 18 (2004) 872; D. Bianchi, E. Jean, A. Ristori, R. Vonarb, Energy Fuels 19 (2005) 1453; and R. Vonarb, A. Hachimi, E. Jean, D. Bianchi, Energy Fuels 19 (2005) 35). It was found that a cerium additive decreased the ignition temperature by about 90 K compared with uncatalyzed soot oxidation, and part of the activity is ascribed to $Ce_2O_2S$ like phase, formed from the decomposition of $Ce_2(SO_4)_3$. On the other hand it is shown by temporal analysis of products that, $CeO_2$ lattice oxygen is involved in soot oxidation with $O_2$, when $CeO_2$ is in tight contact with Printex-U soot, which can be considered as a mimic of the fuel borne catalyst (See A. Bueno-Lopez, K. Krishna, M. Makkee, J. A. Moulijn, J. Catal. 230 (2005) 237). Ce(IV)$O_2$ or $CeO_2$ based catalysts supply the lattice oxygen to soot, thus increasing the rate of soot oxidation; and the gas phase oxygen will replace the thus formed vacant sites on Ce(III)$O_x$.

Soot oxidation was also studied with NO+$O_2$, over soot containing fuel borne ceria catalysts as well as by externally adding $CeO_2$ to soot (See S. J. Jelles, R. R. Krul, M. Makkee, J. A. Moulijn, Catalysis Today 53 (1999) 623; S. J. Jelles, M. Makkee, J. A. Moulijn, Topics in Catalysis 16 (2001) 269; and A. Setiabudi, J. Chen, G. Mul, M. Makkee, J. A. Moulijn, Applied Catalysis B: Environmental 51 (2004) 9). The main reaction in such a process is NO oxidation to $NO_2$, wherein the $NO_2$ formed is a powerful oxidant than $O_2$. However most of these studies are performed in loose contact mode and not with $CeO_2$ and soot in tight contact and $NO+O_2$ as an oxidant. Soot oxidation in the presence of Co—K—Ba/$CeO_2$ catalysts (in tight contact with soot) with feed gas containing NO has also shown that surface nitrogen containing species are involved in oxidizing soot at much lower temperatures (See V. G. Milt, C. A. Querini, E. E. Miro, M. A. Ulla, J. Catal. 220 (2003) 424).

Ce and Pt—Ce fuel borne catalysts are extensively studied by Jelles et al. (See S. J. Jelles, R. R. Krul, M. Makkee, J. A. Moulijn, Catalysis Today 53 (1999) 623; S. J. Jelles, M. Makkee, J. A. Moulijn, Topics in Catalysis 16 (2001) 269; and S. J. Jelles, R. R. Krul, M. Makkee, J. A. Moulijn, G. J. K. Acres, J. D. Peter-Hoblyn, SAE 1999-01-0113). It has been found that Pt—Ce fuel borne catalysts are very active in soot oxidation and have shown lowest balance point among the catalysts known so far (275-300° C.). It is observed that these fuel borne ceria catalysts are more active after an initial induction period of a catalyzed trap. During this induction it is proposed that, platinum coats the walls of the trap and catalyses the oxidation of NO to $NO_2$. The thus formed $NO_2$ is more reactive towards Pt—Ce-soot compared with Fe-soot and Cu-soot. Furthermore, it is postulated that, $NO_2$ decomposes over $CeO_2$ to form active oxygen, 'O', which oxidizes soot efficiently. Fe and Cu do not seem to catalyze such oxygen transfer reactions.

There is a current need for new insights on mechanistic aspects for very high efficiency of Pt—Ce fuel borne catalysts, compared with other fuel borne catalysts/catalyzed soot filter systems and to employ them to design particulate filters with improved efficiency, and this patent application discloses such improvements. Desirably, this knowledge could aid in providing traps with improved regeneration characteristics, which could preferably retain increased levels of ultrafine particles without disadvantageous sacrifices in fuel economy or DPF size.

SUMMARY OF THE INVENTION

It is an object of this invention to provide new insights on mechanistic aspects for very high efficiency of Pt—Ce fuel borne catalysts and to employ them in the design of particulate filters with improved efficiency.

It is another object of the invention to provide particulate filters with improved efficiency in terms of regeneration characteristics.

It is another object of the invention to provide particulate filters with improved regeneration characteristics, which could preferably retain increased levels of ultrafine particles without disadvantageous sacrifices in fuel economy or DPF size.

It is yet another object of the invention to provide particulate filters with improved regeneration characteristics, which can operate with conventional diesel fuels containing as much as 500 ppm of sulfur but can take special advantage of low and ultra-low sulfur fuels as well as bio fuels having little or no sulfur.

It is another object of the invention to provide improved wall flow and other particulate filters with self regeneration characteristics that permit reducing the emission of ultrafine particles without disadvantageous sacrifices in fuel economy or DPF size.

These and other objects are achieved according to the invention which provides both improved processes and apparatus for reducing emissions of particulates from diesel engines.

In one aspect, the invention provides an improved process for operating a diesel engine with reduced emissions of particulates, which comprises: operating a diesel engine with a fuel containing a fuel borne catalyst comprising a fuel soluble or dispersible cerium composition and a fuel soluble or dispersible platinum group metal composition; passing exhaust produced by combustion of the fuel and containing both cerium oxide and platinum group metal released from the fuel by combustion, through a diesel particular filter having at least two stages comprised of (a) a catalyst section having a platinum group metal catalyst on contact surfaces within the catalyst section and (b) a filter section comprised of passages effective to remove particulates from a moving stream of combustion gases generated by combusting the fuel in the engine and holding them therein to permit their oxidation, wherein the improvement comprises utilizing levels of platinum group metal composition, cerium compositions, fuels and optional chemical enhancers to generate $NO_2$ and nitrates in the catalyst section in amounts sufficient to form cerium nitrates on the fuel borne catalyst and in the filter section whereby the cerium oxide maintains dispersion of the platinum in the filter section and the cerium nitrates will migrate to the surface of the soot particles to provide enhanced soot oxidation at a lower balance point than could be achieved without the provision of the platinum group metal and cerium fuel additive in the two stage filter. Among the suitable chemical enhancers are soluble or dispersible alkali metal and/or alkaline earth compositions in the fuel in amounts effective to enhance the most active species of surface nitrates, especially cerium nitrates.

In another aspect the invention provides DPF apparatus which is used in advance of a selective catalytic reduction (SCR) unit, wherein the reduced particulates, and presence of $NO_2$ will aid in the effectiveness of the SCR unit in reducing residual $NO_x$. Thus, the $NO_x$ is reduced initially in this embodiment by the utilization of some of the NO in the conversion of carbon and then again in the SCR unit. In this embodiment, there may be used an additional catalyst ahead of the SCR to convert remaining NO to $NO_2$.

In yet another aspect, the invention provides a filter comprised of at least three stages, comprised of (a) a catalyst section having a platinum group metal catalyst on contact surfaces within the catalyst section and (b) a filter section comprised of passages effective to remove particulates from a moving stream of combustion gases generated by combusting the fuel in the engine and holding them therein to permit their oxidation, as described above, and additionally a filter section capable of removing ultrafine particles.

Many preferred aspects of the invention, and apparatus for performing the processes will be detailed in the description which follows and as can be seen in the drawings.

BRIEF DESCRIPTION OF THE DRAWINGS

The invention will be better understood and its advantages will become more apparent from the following detailed description, especially when taken with the accompanying drawings, wherein experimental results are shown in FIG. 1a through FIG. 10, FIG. 11 is a schematic of a reaction environment discussed below and FIG. 12a through FIG. 15 show different embodiments of the invention, as follows:

FIG. 1a shows XRD spectra of fresh soot samples as indicated

FIG. 1b is a graphical comparison of fresh Pt—Ce-soot and 70% oxidised Pt—Ce-soot. 70% oxidised Pt—Ce-soot XRD spectra are collected under different instrument settings.

FIG. 11 is a sketch of one schematic reaction environment to aid in understanding the experimental section.

FIG. 12a is a schematic of a DPF according to the invention

FIG. 12b is a variation of the embodiment to FIG. 12a, showing means for introducing fuel and/or catalyst to aid regeneration;

FIG. 13 is a schematic of one preferred DPF combination of the invention;

FIG. 14 is a schematic of another preferred DPF combination of the invention; and FIG. 15 is a variation of the embodiment to FIG. 14, showing means for introducing fuel and/or catalyst to aid regeneration and the addition of a filter for ultrafine particles.

DETAILED DESCRIPTION OF THE INVENTION

Figure 2A:
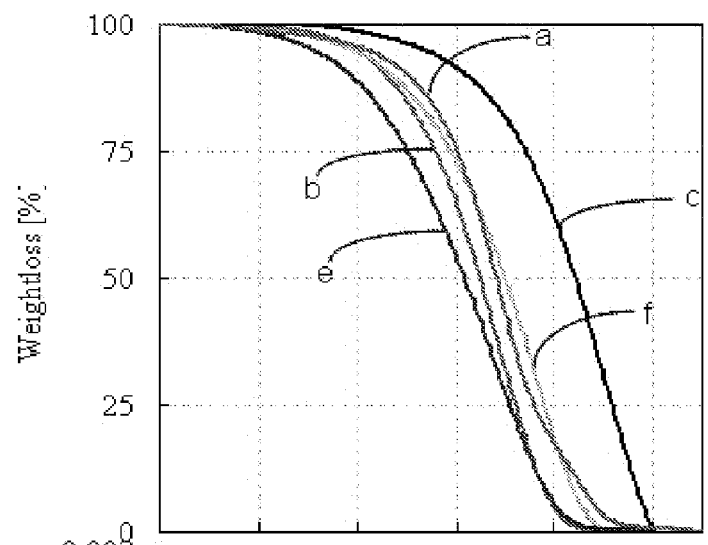
FIG. 2a is a graph of experimental results showing weight loss with temperature during soot oxidation with air.

The invention provides improvements in controlling the emission of particulates form diesel engines. It does so based on testing outlined in the Examples below and with the implementation of new diesel particulate filter/fuel additive combinations.

The invention is based on discoveries most easily observable with low sulfur content fuels, whereas they are effectively utilized in all fuels suitable for diesel use, including those with up to about 500 ppm sulfur. The term "fuel" is thus intended to include all of those fuels effective for operating diesel engines. The fuel can contain detergent (e.g., 50-300 ppm), lubricity additive (e.g., 25 to about 500 ppm) and other additives, as desired.

Among the fuels suitable for use in the invention are those which typically comprise a fossil fuel, such as any of the typical petroleum-derived fuels including distillate fuels. A fuel can be one or a blend of fuels selected from the group consisting of: distillate fuels, including diesel fuel, e.g., No. 2 Diesel fuel, No. 1 Diesel fuel, jet fuel, e.g., Jet A, or the like which is similar in boiling point and viscosity to No. 1 Diesel fuel, ultra low sulfur diesel fuel (ULSD); liquid fuels comprising hydrocarbons derived from gaseous or solid fuels; and biologically-derived fuels, such as those comprising a "mono-alkyl ester-based oxygenated fuel", i.e., fatty acid esters, preferably methyl or ethyl esters of fatty acids derived from triglycerides, e.g., soybean oil, Canola oil and/or tallow, or "Gas-to-Liquids" fuels derived from biomass, natural gas, coal or petroleum sources. The term "hydrocarbon fuel" is meant to include all of those fuels prepared from "distillate fuels" or "petroleum". Gasoline, jet fuel, diesel fuel, and various other distillate fuels are included. The term "distillate fuel" means all of those products prepared by the distillation of petroleum or petroleum fractions and residues. The term "petroleum" is meant in its usual sense to include all of those materials regardless of source normally included within the meaning of the term, including hydrocarbon materials, regardless of viscosity, that are recovered from fossil fuels.

Jet A and Diesel No. 1 are deemed equivalent for applications of the invention, but are covered by different American Society For Testing and Materials (ASTM) specifications. The diesel fuels are covered by ASTM D 975, "Standard Specification for Diesel Fuel Oils". Jet A has the designation of ASTM D 1655, "Standard Specification for Aviation Turbine Fuels". The term ultra low sulfur diesel fuel (ULSD) means No. 1 or No. 2 diesel fuels with a sulfur level no higher than 0.0015 percent by weight (15 ppm) and some jurisdictions require a low aromatic hydrocarbon content e.g., less than ten percent by volume.

The term "diesel fuel" means "distillate fuels" including diesel fuels meeting the ASTM definition for diesel fuels or others even though they are not wholly comprised of distillates and can comprise alcohols, ethers, organo-nitro compounds and the like (e.g., methanol, ethanol, diethyl ether, methyl ethyl ether, nitromethane). Also within the scope of this invention, are emulsions and liquid fuels derived from vegetable or mineral sources such as corn, alfalfa, shale, and coal. These fuels may also contain other additives known to those skilled in the art, including dyes, cetane improvers, anti-oxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, antiicing agents and the like.

The process of the invention employs a fuel-soluble, multi-metal catalyst, i.e., a fuel borne catalyst (FBC), preferably comprising a fuel-soluble or dispersible platinum group metal composition and a fuel-soluble or dispersible cerium composition. The cerium composition is preferably employed at concentrations effective to provide from 0.5 to 20 ppm cerium. The platinum group metal composition is preferably employed at concentrations effective to provide from 0.0005 to 2 ppm platinum. More preferred levels of cerium are from 2 to 10 ppm, more narrowly from 3 to 8 ppm, e.g., 7.5 ppm. And, the more preferred levels of platinum are from 0.0005 to 0.5 ppm, e.g., less than 0.25 ppm. In some embodiments, the treatment regimen can call for the utilizing higher catalyst concentrations initially or at defined intervals or as needed, but not for the whole treatment.

An advantage of low levels of catalyst (about 3 to 15 ppm total), preferably below 12 ppm and more preferably below about 8 ppm, is the reduction in ultra fine particles resulting from carbonaceous soot and metal oxide emissions. It is an advantage of the invention that the low levels of catalyst produce less ash than those typical commercial levels, and several embodiments are afforded to filter out the fine and ultrafine PM without sacrificing significant fuel economy or DPF size.

Among the specific cerium compositions are: cerium III acetylacetonate, cerium III napthenate, and cerium octoate, cerium oleate and other soaps such as stearate, neodecanoate, and other $C_6$ to $C_{24}$ alkanoic acids, and the like. Many of the cerium compounds are trivalent compounds meeting the formula: $Ce(OOCR)_3$ wherein R=hydrocarbon, preferably $C_2$ to $C_{22}$, and including aliphatic, alicyclic, aryl and alkylaryl. Preferably, the cerium is supplied as cerium hydroxy oleate propionate complex (40% cerium by weight) or a cerium octoate (12% cerium by weight). Preferred levels are toward the lower end of this range. In alternative embodiments, the cerium can be substituted partially or in whole by a rare earth element in the form of fuel additive.

Any of the platinum group metal compositions, e.g., 1,5-cyclooctadiene platinum diphenyl (platinum COD), described in U.S. Pat. No. 4,891,050 to Bowers, et al., U.S. Pat. No. 5,034,020 to Epperly, et al., and U.S. Pat. No. 5,266,083 to Peter-Hoblyn, et al., can be employed as the platinum group metal source. Other suitable platinum group metal catalyst compositions include commercially-available or easily-synthesized platinum group metal acetylacetonates, including substituted (e.g., alkyl, aryl, alkyaryl substituted) and unsubstituted acetylacetonates, platinum group metal dibenzylidene acetonates, and fatty acid soaps of tetramine platinum metal complexes, e.g., tetramine platinum oleate.

The improvement of the invention is based on the discovery that various factors utilizing levels of platinum group metal composition, cerium compositions, fuels and optional chemical enhancers can increase the generation of $NO_2$ in a catalyst section in amounts sufficient to form cerium nitrates in the filter section whereby the cerium oxide is associated with and maintains dispersion of the platinum in the filter section and the cerium nitrates will be available at the surface and within the soot particles to provide enhanced soot oxidation at a reduced balance point. The invention enhances the formation of cerium nitrates, which are found to be a highly active species.

Among the suitable chemical enhancers are soluble or dispersible alkali metal and/or alkaline earth compositions in the fuel in amounts effective to enhance the most active species of surface nitrates, especially cerium nitrates. Such enhancers may be added via the fuel and/or in the catalyst and/or filter device. Among the suitable metal compositions are any of the known fuel borne catalysts of are barium, calcium, strontium, zirconium and potassium. These compositions should be employed in an amount sufficient to supply from about 0.1 to about 1.0 of the weight of the noted metal to the amount of cerium in the fuel. And, the amount of platinum group metal to cerium will be within the range of from about 0.01 to about 0.15 by weight. An enhancer for cerium nitrate formation can be employed as a wash coat to make it part of the catalyst section as manufactured.

Among the suitable catalytic forms of the alkali metal and alkaline earth compositions suitable as enhancers are the alcoholates, sulfonates, beta-diketonates and soaps, e.g., selected from the group consisting of stearates, palmitates, laurates, tallates, napthanates, other fatty acid soaps, and mixtures of two or more of these. Among the sodium compositions are organometallic compounds and complexes as well as the salts of sodium with suitable organic compounds such as alcohols or acids, e.g., aliphatic, alicyclic and aromatic alcohols and acids. Exemplary of particular salts are the sodium salts of tertiary butyl alcohol and mixtures of these. Other sodium organic salts are available and suitable for use to the extent that they are fuel-soluble and are stable in solution. While not preferred, inorganic salts can also be employed to the extent that they can be efficiently dispersed in the fuel, such as in a stable emulsion or otherwise. Among the specific sodium compounds are: the salts of sulfonated hydrocarbons, for example sodium petroleum sulfonate, available as Sodium Petronate from Crompton Corporation ($NaO_3SR$, R=alkyl, aryl, arylalkyl, and R is a hydrocarbon having greater than three carbons); sodium alcoholates, for example sodium t-butoxide and other fuel-soluble alkoxides (NaOR, wherein R is an alkyl, e.g., from 3 to 22 or more carbons; and sodium napthenate (sodium salts of naphenic acids derived from coal tar and petroleum). Similar compounds of the other metals are useful as available.

The enhancements in DPF operation provided by the invention will be best seen when viewed as embodied in several representative configurations of DPF devices (FIG. 12a through FIG. 15), which depict mean for practicing the invention. In each case described herein, the diesel particulate filters include at least two stages comprised of (a) a catalyst section 5 having a platinum group metal catalyst on contact surfaces within the catalyst section and (b) a filter section 12 comprised of passages effective to remove particulates from a moving stream of combustion gases generated by combusting the fuel in the engine and holding them therein to permit their oxidation. The catalyst and filter sections may be integral to a single section of the device, i.e., catalyzed and zone-catalyzed filters may advantageously be used. The devices will also preferably include a third stage filter 112 to collect fine and ultra fine particles. Active regeneration strategies include fuel injection upstream of the catalyst in sensor-activated operation. This mode provides increased catalyst and filter operating temperature for oxidation of particulate matter and hydrocarbons. In this invention, the addition of fuel-borne catalyst and/or activators to the fuel provide improved emissions performance and low temperature regeneration, according to the mechanisms described herein. The catalyst section can be integral with the filter section, but is shown here as separate.

Reference is made to FIG. 12a, which shows a representative device utilizing the improvements of the invention. An internal combustion engine, e.g., a Diesel engine 11 is operated on fuel containing a fuel additive as described to produce an exhaust gas 1, which contains carbon dioxide ($CO_2$), water vapor ($H_2O$), carbon monoxide (CO), hydrocarbon (HC), nitrogen oxides ($NO_x$), carbon particles (PM), etc. An exhaust pipe 2, 3 for the exhaust gas 1 is provided with a multi stage DPF 4 comprised of at least two stages, a catalyst section 5 and a filter section 12. Advantageously, the invention provides an improvement wherein sufficient but low amounts of platinum group metal are utilized in the fuel to generate $NO_2$ in the catalyst section in amounts sufficient to form cerium nitrates in the filter section whereby the cerium oxide maintains dispersion of the platinum in the filter section and the cerium nitrates will migrate to the surface of the soot particles to provide enhanced soot oxidation at a lower balance point than could be achieved without the provision of the platinum group metal and cerium fuel additive in the two stage filter. In the embodiment wherein the third stage filter 112 is employed, the invention provides radically decreased particulates in all size ranges and is self regenerating at very low temperatures of the type most frequently encountered in mobile operation.

Figure 15:
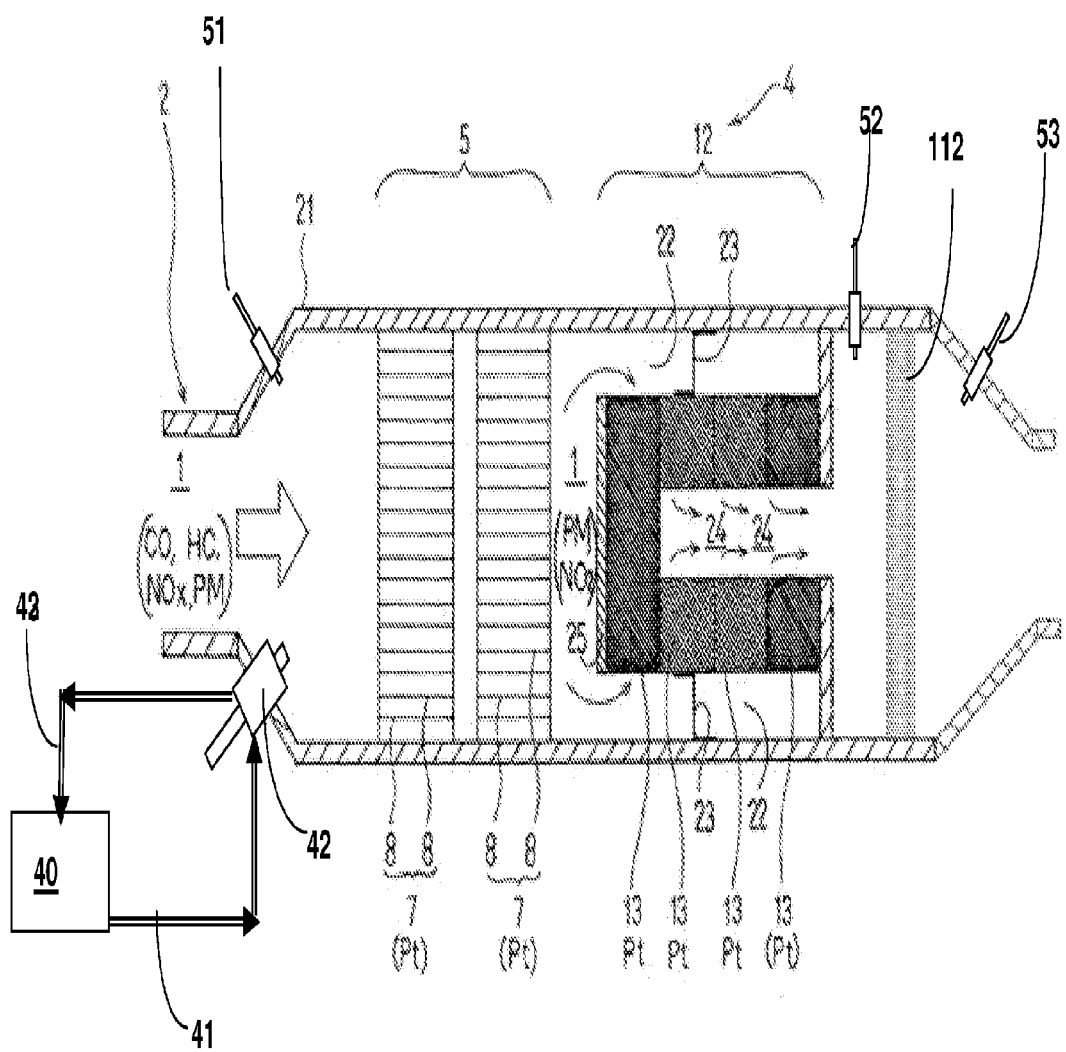

The catalyst section 5 has as its purpose the catalytic conversion of NO to $NO_2$ which is a strong oxidant of carbon in its own right; but which in the invention employing cerium and platinum group metals in a fuel borne catalyst, result in the formation of surface nitrates on cerium oxide particles produced from the fuel borne catalyst during combustion in the engine 11. This catalyst section 5 is preferably catalyzed with platinum or other platinum group metal initially, but can be catalyzed by running the engine on the fuel borne catalyst mentioned above at doses listed or higher for a time sufficient to catalyze the substrate employed. In some cases, as shown in FIG. 12b, fuel can be injected into the engine exhaust upstream of the catalyst and/or filter sections to raise the temperature within the catalyst and filter sections of the device. The fuel can contain a fuel borne catalyst and/or enhancer. FIG. 12b shows sensors 51, 52 and 53, which can be pressure and/or temperature sensors as needed to determine important operational parameters such as the temperature of the filter and catalyst sections, the back pressure in through the DPF, and the like. When the back pressure is determined to be too high, fuel from tank 40 and line 41 with or without a fuel borne catalyst can be introduced, such as with an injector 42 of the type which has a return line 42 for cooling as described in U.S. Pat. Nos. 5,976,475 or 6,279,603, the disclosures of which are hereby incorporated by reference. A similar arrangement is shown in FIG. 15.

The substrate for catalyst section 5 can be a typical catalyst support, e.g., of alumina, a silica-alumina composition such as cordierite, silicon carbide, glass or metal fibers, porous glass, ceramic or metal substrates, and the like. The most preferred support material will be a ceramic filter, such as Silicon Carbide, which is available as DiSiC from Dinex A/S. A conventional ceramic monolith supported catalyst typically contains from about 30 to 90 $gm/ft^3$ platinum group metals, e.g., approximately 50 $gm/ft^3$ Pt of catalyst support volume. Base metal catalysts and nano-structured catalysts, such as those available from Catalytic Solutions, Inc., provide a means to catalytic activity with reduced utilization of platinum group metals. The formulation of the solid catalysts and catalyst washcoats may also include alkali metal or alkaline earth metal activators. These are suitable for the invention as are those more recently provided. A manufacturer of such devices has introduced a system which utilizes a heavily catalyzed DPF to help with low temperature regeneration, e.g., with precious metal loadings (e.g., platinum group metals) reportedly 90 to 120 $gm/ft^3$; however, these loadings are very costly. Lower platinum loadings of less than about 15 $gm/ft^3$ platinum group metal loading, e.g., 1-15 $g/ft^3$, more narrowly less than about 10 $gm/ft^3$, e.g., about 3 to 5 $gm/ft^3$ are within the contemplation of the invention, but will not generate $NO_2$ at high levels in comparison to total NO concentrations.

Filter section 12 can be any of those devices known in the art as useful for DPF devices which trap and hold for burning at least a portion of the particulates produced by a diesel engine. Among these are wall flow monolith devices of type device known to be useful for particulate traps, wire mesh filters, e.g., as described in EP 12 62 641 and others, including extruded porous devices such as available from NGK and Corning, Inc., sintered metal filters such as available from PUREM, corrugated metal filters, and the like.

The optional third stage filter 112 can be any of those known in the art for removing fine and ultrafine particles, e.g., less than 50 nm and preferably less than 30 nm. Those made of silicon carbide can be effective as can others, which can be selected. They can be catalyzed for the oxidation of residual carbon or to convert remaining NO to $NO_2$ for further $NO_x$ reduction by SCR in a later stage. Uncatalyzed devices or devices with catalysts having a reducing function can be employed, the latter being useful where it is desired to eliminate $NO_2$, which may have been generated but not utilized. FIG. 15 shows a particular arrangement with ultrafines trap 112.

In another aspect the invention provides DPF apparatus which is used in advance of a selective catalytic reduction (SCR) unit, wherein the reduced particulates, and presence of $NO_2$ will aid in the effectiveness of the SCR unit in reducing residual $NO_x$. Thus, the $NO_x$ is reduced initially in this embodiment by the utilization of some of the $NO_x$ in the conversion of carbon and then again in the SCR unit. In this embodiment, there may be used an additional catalyst ahead of the SCR to convert remaining NO to $NO_2$.

Figure 13:
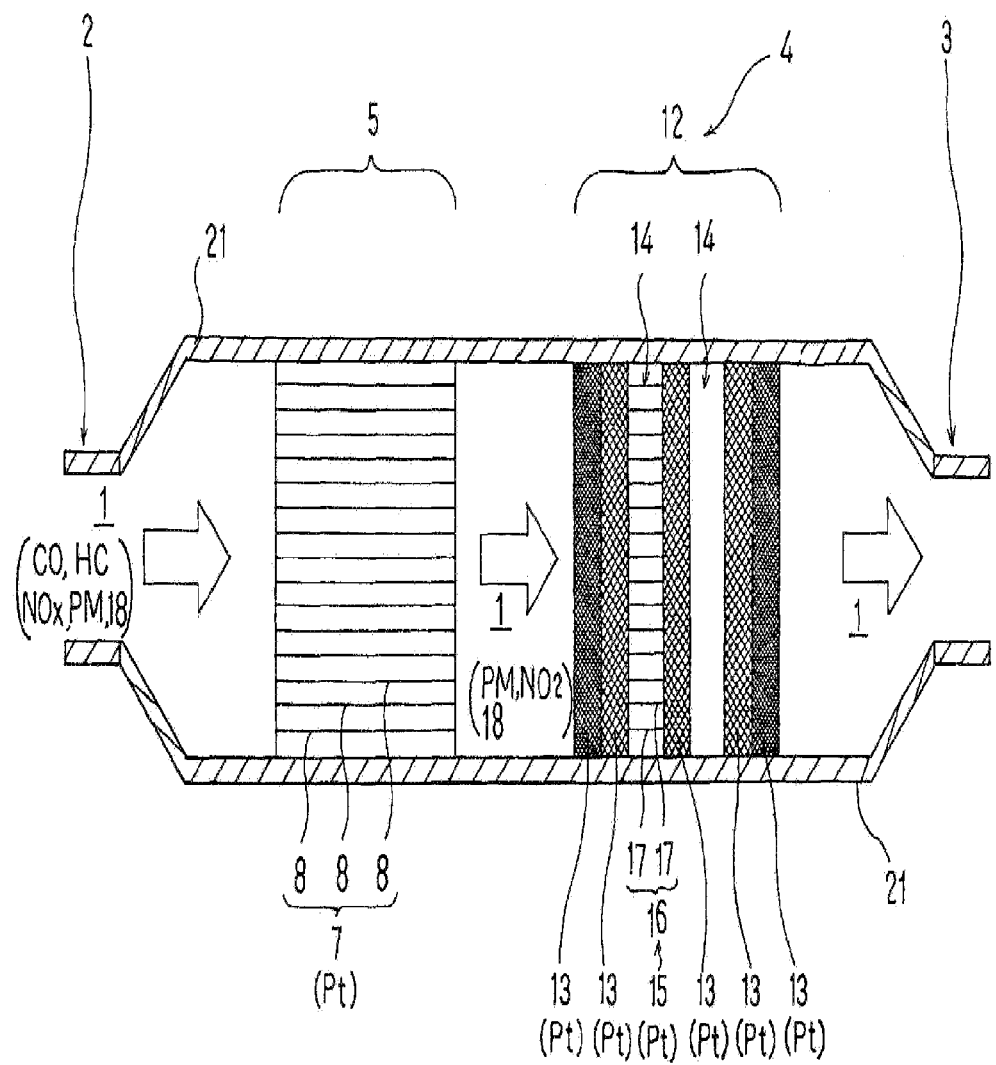
Figure 14:
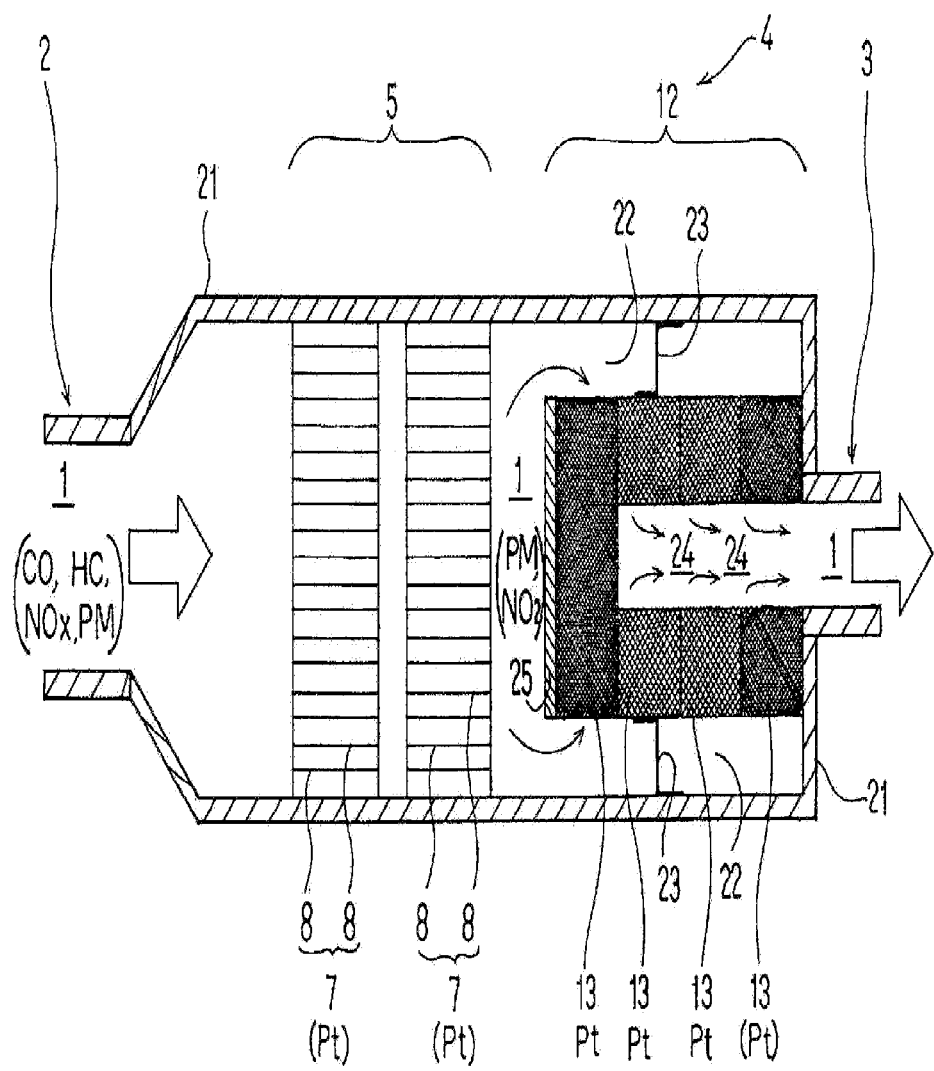

The improvements of the invention are realized with specially designed DPF devices having at least two and preferably at least three stages, which may be separately configured or configured as part of an integrated apparatus. To aid in understanding representative structures, several representative embodiments are illustrated in FIG. 13 and FIG. 14, the construction of which can follow the description of EP 1 262 641, the disclosure of which is incorporated herein in its entirety. The DPF 4 is detachably provided with a catalyst section 5 to cause CO, HC, etc. contained in the passing exhaust gas 1 to oxidize and burn, thereby reducing and/or eliminating them. In addition, the catalyst section 5 catalyzes NO oxidization to nitrogen dioxide $NO_2$. The filter section 12 for carbon particles PM is caused to capture and accumulate, and then oxidize and burn the carbon particles PM contained in the passing exhaust gas 1, thereby reducing and/or eliminating the carbon particles PM. The catalytic converter 4 is constructed as described in the above.

FIG. 14 shows filter section 12 to comprise one or more filters 13 having a wire mesh structure as described in EP 1 262 641, which are caused to capture and accumulate the carbon particles PM from within the exhaust gas 1 to oxidize and burn the carbon particles PM to reduce and/or eliminate the carbon particles PM. Thus, the reducing filter section 12 is essentially continuously regenerated during use which supplies effective balance point temperatures as can be reduced by the invention. The individual filters 13 can be of a wire mesh structure in which extra fine metal wires are vertically and laterally meshed in a fine and dense net form. The filters 13 are typically formed from metal such as stainless steel, but may be formed by a fibrously woven aggregate or a punched aggregate.

The filters 13 of the reducing apparatus 12 can be formed as describe in EP 1 262 641 or as otherwise known to the art. FIG. 14 shows a plurality of filters 13 held within the outer cylindrical casing 21 by a holder by providing a space 22 between the filters 13 and the outer cylindrical casing 21. An opening 24 for communication is formed in the central section of each filter 13. In FIG. 14, four (4) filters 13 are combined in contact which have the same outer diameter, and upper and lower spaces 22 are provided between the outer cylindrical casing 21 and the filters 13. One filter on the most upstream side does not have the communication opening 24 formed and the remaining three (3) filters 13 are respectively provided with an opening 24 for communicating with one another. These communication openings 24 are arranged to communicate with an exhaust pipe 3 on the downstream side. Reference numeral 25 in FIG. 14 is a plate for closing one end of the filter 13 on the upstream side.

In the embodiment wherein the DPF apparatus is used in advance of a selective catalytic reduction (SCR) unit, wherein the reduced particulates, and presence of $NO_2$ will aid in the effectiveness of the SCR unit in reducing residual $NO_x$. Thus, the $NO_x$ is reduced initially in this embodiment by the utilization of some of the $NO_x$ in the conversion of carbon and then again in the SCR unit. In this embodiment, there may be used an additional catalyst ahead of the SCR to convert remaining NO to $NO_2$.

In this embodiment, the DPF is preferably placed upstream of the SCR unit. This has at least three advantages: (1) the exhaust in the trap is hotter and makes regeneration easier; (2) the exhaust entering the catalyst chamber 30 is cleaner; and (3) the temperature of the catalyst in chamber is suitable for NO reduction. The combustion gases 1 exiting section 112 are then contacted with a suitable $NO_x$-reducing agent, such as urea or an equivalent, at a temperature effective to reduce the level of $NO_x$ in the combustion gases and produce ammonia by the decomposition of the $NO_x$-reducing agent. The preferred temperatures for reaction between the $NO_x$-reducing composition and $NO_x$ in the combustion gases, falls within the range of from about 1600° to 2000° F. Urea is an effective chemical for $NO_x$ reduction at high temperature and/or high pressure, but can be replaced with one or more of its hydrolysis products. Various NH-containing compositions, in their pure and typical commercial forms, will generate effective gas-phase agents (e.g., the amidozine radical) when introduced in aqueous solution and subjected to elevated temperatures.

Among the prominent NH-containing compositions are those selected from the group consisting of ammonia, urea, urea precursors, urea hydrolysis products, products of reaction of urea with itself or other compositions, related compositions, and mixtures of these. Among these compounds are ammonium carbonate, ammonium formate, ammonium citrate, ammonium acetate, ammonium oxalate, other ammonium salts (inorganic and organic) particularly of organic acids, ammonium hydroxide, various stable amines, guanidine, guanidine carbonate, biguanide, guanylurea sulfate, melamine, dicyanimide, calcium cyanamide, cyanuric acid, biuret, 1,1-azobisformamide, methylol urea, methylol urea-urea, dimethyl urea, hexamethylenetetramine (HMTA), and mixtures of these. Reactors effective to reduce $NO_x$ utilizing hydrocarbons are also contemplated.

The following experimental section is presented to further explain and illustrate the invention and are not to be taken as limiting in any regard.

EXPERIMENTAL

Materials and Characterization

Ce (50 ppm), Pt (50 ppm), Pt—Ce-soot (2 ppm Pt and 30 ppm Ce), Cu-soot (100 ppm) and Fe (44 ppm) containing soot is generated from the respective fuel borne catalyst additives (concentration given in parenthesis is added to the fuel) in a real diesel engine. The diesel engine used for soot collection and filter evaluation was a two cylinder LPW2, produced by Lister-Petter, UK. The engine was direct injected; water-cooled and naturally aspired, and was equipped with a Stamford generator. The electrical power generated (engine was run at 75% load) was dissipated through an electrical resistor. The fuel consumption was 1.25 kg/h and showed no significant change during the experimental program. The diesel fuels that were used during the program were standard EN590 fuels, summer specification and Shell V-Power Diesel. The fuel sulfur content was in general 500 ppm (0 ppm for Shell V-Power diesel). The metal fuel additives used in the project are listed in Table 1.

TABLE 1

| Fuel borne catalysts and its source. | |
|---|---|
| Metal | Additive |
| Pt | Platinum Plus 3100 |
| Ce | Rhône-Poulenc DPX9 |
| Cu | Lubrizol OS-96401 |
| Fe | Aldrich Ferrocene |

When the fuel composition was changed, the fuel filter was also changed and the engine was conditioned on the new fuel over night. Soot samples are collected by passing the full exhaust gas stream through a filter, contained in a filter holder, until the back pressure reached 0.5 bar. The back pressure was then maintained at 0.5 bar using a slipstream valve. The filters used were Gelman Sciences A/E 265 mm filters, supported by paper filters to prevent rupture of the filter due to exhaust gas pulsation. When soot samples were taken with a new fuel composition, the engine exhaust pipe and filter holder were cleaned after the engine had run in on the new fuel composition for 10-20 hours after the fuel change. The NOx concentration in the exhaust gas is not measured and during soot collection itself significant amount of soot oxidation, especially for soot having Pt—Ce combinations, is expected. The collected soot was scraped of the filter and sieved with a 250 mm sieve. Further details on metal-soot collection can be found in ref (See S. J. Jelles, R. R. Krul, M. Makkee, J. A. Moulijn, Catalysis Today 53 (1999) 623 and S. J. Jelles, R. R. Krul, M. Makkee, J. A. Moulijn, G. J. K. Acres, J. D. Peter-Hoblyn, SAE 1999-01-0113).

Printex-U, a carbon pigment from Degussa S. A, is used as a model soot for comparison of oxidation rates. 2.5 wt % $Pt/Al_2O_3$ ($Pt/Al_2O_3$) catalyst is obtained from Engelhard Corporation, USA. $Ce(NO_3)_3.6H_2O$ is used as a catalyst to study soot oxidation, in tight contact with catalyst (prepared by mixing nitrate-soot in a mortar), in DRIFT cell connected to MS. Selected soot samples are characterized by XRD analysis.

Soot Oxidation

Soot oxidation in 100 ml/min air is studied in thermogravimetric analyzer (TGA/SDTA851$^e$, Mettler Toledo), from RT up to 800° C. with 10° C./min heating rate. The soot sample was diluted in order to minimize heat and oxygen mass transfer influences on oxidation rates.

A loose contact mixture of 80 mg of $Pt/Al_2O_3$ (when used) and 20 mg of soot (with and with out fuel borne catalyst), mixed with a spatula and diluted with 400 mg of SiC is packed between two quartz wool plugs in a tubular quartz reactor. Soot oxidation is studied with 200 ml/min of 10 vol % $O_2$ or $NO_x+10$ vol % $O_2$ in Ar (the concentration of NO is mentioned in the legend of the respective experiments). NDIR analyzer is used to monitor the reactant and product gases $CO_2$, CO, and NO. $NO_2$ is calculated from the difference of NO inlet and outlet concentrations.

Results

FIG. 1a shows X-ray diffractograms of diesel engine generated fuel borne catalyst containing soot, and commercial printex-U soot. The prominent diffraction peak around 25° is due to the diffraction from the stacked graphite sheets in soot particles (See A. Sadezky, H. Muckenhuber, H. Grothe, R. Niessner, U. Poschl, Carbon 43 (2005) 1731). All soot samples showed similar features, with Pt-soot the diffraction peak slightly shifted to higher 2θ value and the intensity of the diffraction peaks is higher. The fuel borne catalyst-soot samples have shown diffraction peaks corresponding to the fuel borne catalyst in addition to the diffraction bands of graphite sheets. Pt-soot, generated from 50 ppm Pt additive, and from fuel not containing sulphur, shows sharp diffraction peaks corresponding to Pt°, indicating large Pt particles. In Pt—Ce-soot, generated from 2 ppm Pt-30 ppm Ce additive, from a fuel containing 500 ppm sulfur, prominent diffraction peaks corresponding to $Ce_2(SO_4)_3$ and weak peaks corresponding to $CeO_2$ are evident. Diffractions corresponding to Pt are not observed in Pt—Ce-soot. Pt—Ce-soot is oxidized in 5000 ppm $NO_2+10$ vol % $O_2$ in Ar at 350° C., to see the changes occurring in the soot and fuel borne catalyst structure due to progressive soot burning.

FIG. 1b shows the diffractogram of 70% oxidized Pt—Ce-soot. Essentially all diffraction peaks, including graphitic diffractions that are observed in the original Pt—Ce-soot, are present in the 70% oxidized Pt—Ce-soot. The intensity of the diffraction peaks of the fuel borne catalyst increased due to increased amount in 70% oxidized soot. Oxidation of soot did not change the $Ce_2(SO_4)_3$ phase as observed by Retailleau et al. (See L. Retailleau, R. Vonarb, V. Perrichon, E. Jean, D. Bianchi, Energy Fuels 18 (2004) 872). The important observation is that even in 70% oxidized soot significant diffractions due to graphitic sheets are observed. This indicates that the soot burning is first taking place on amorphous mass inside the soot particle, followed by the consumption of the graphitic sheets. Which also suggests that the oxidation model may not follow shrinking core formalism, which is usually derived by determining the order of oxidation with respect to soot (See B. R. Stanmore, J. F. Brilhac, P. Gilot, Carbon 39 (2001) 2247; and A. Mes serer, R. Niessner, U. Poschl, Carbon 44 (2006) 307).

Figure 2B:
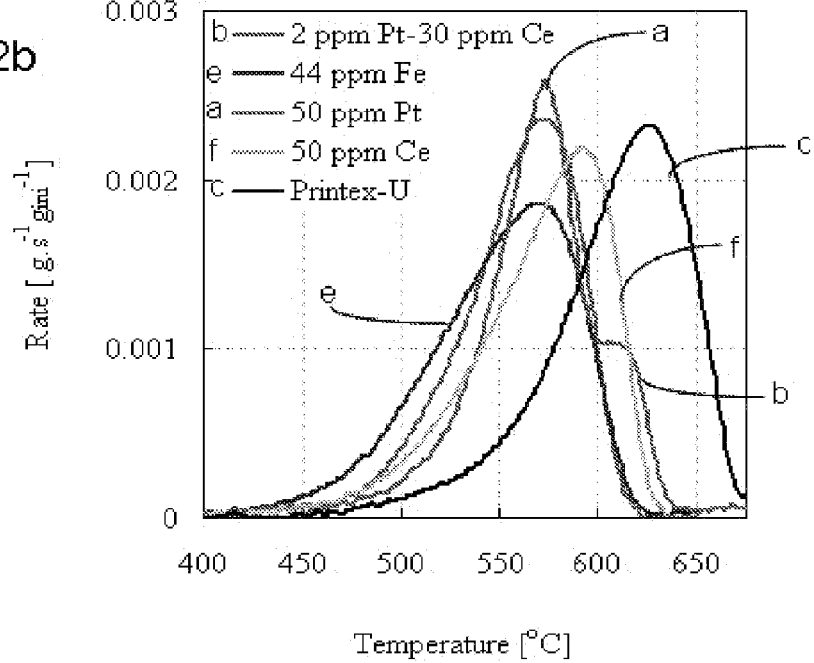
FIG. 2b is a graph of experimental results showing normalised soot oxidation rates. Reaction conditions: reactor-TGA, feed gas –100 ml/min air, heating rate –10° C./min.

FIG. 2 shows fuel borne catalyst-soot oxidation in 10 vol % $O_2$ in air in TGA in comparison with printex-U soot oxidation. Majority of the soot is burned between 400 to 650° C., and soot weight loss due to oxidation with air is normalized to 100% in the above temperature region. All fuel borne catalysts have shown a significant increase in soot oxidation activity compared to un-catalyzed printex-U soot oxidation. Generally Pt does not catalyze soot oxidation, due to very small crystallite size, which essentially exists in Pt° state in soot. However the amount of Pt in Pt-soot can be expected to be around 13 mg Pt/g soot, resulting in a big crystallite size. Such a large Pt crystallites are able to oxidize soot, and Pt-soot showed similar activity as that of Ce-soot. A plateau between 600-620° C. is observed for Pt-soot normalized oxidation rate (FIG. 2b). The appearance of plateau means, the oxidation rate is increasing between 600-620° C., likely due to increased contact between Pt crystallites and soot, as a result of Pt sintering.

A relatively larger improvement in soot oxidation rates can be observed over, Fe-soot and Pt—Ce-soot, compared to Pt-soot and printex-U soot. The differences in the observed activity cannot be directly correlated to the amount of fuel borne catalyst or its dispersion in the respective soot samples. From XRD it is clearly evident that, as some of these soot samples are generated from $SO_2$ containing fuel, essentially the majority of the fuel borne catalyst is present as sulfates. Only a fraction of the added ceria is present as $CeO_2$. Retailleau et al. (See L. Retailleau, R. Vonarb, V. Perrichon, E. Jean, D. Bianchi, Energy Fuels 18 (2004) 872), have shown that around 50% of the fuel borne catalyst ends up as sulfate, which on heating decomposes to $Ce_2O_2S$ like phase that is capable of soot oxidation (See L. Retailleau, R. Vonarb, V. Perrichon, E. Jean, D. Bianchi, Energy Fuels 18 (2004) 872; D. Bianchi, E. Jean, A. Ristori, R. Vonarb, Energy Fuels 19 (2005) 1453; and R. Vonarb, A. Hachimi, E. Jean, D. Bianchi, Energy Fuels 19 (2005) 35). However from XRD no such transformation was evident in the present study and majority of fuel borne catalyst ended up as cerium sulfate, even after 70% soot conversion in the presence of $NO_2$. Though the Fe-soot was not characterized by XRD, considering 500 ppm sulfur present in the fuel used for generating Fe-soot it can be expected that Fe to some extent also forms sulfate. Further more Fe being low atomic weight element, 44 ppm fuel additive will leads to significantly higher iron to carbon ratio in the final Fe-soot and part of the superior activity of Fe-soot can be attributed to this ratio. Compared to Ce-soot alone, presence of Pt—Ce-soot improved oxidation activity. The soot oxidation followed the followed the trend, with decreasing activity, Fe-soot>Pt—Ce-soot>Pt-soot>=Ce-soot>printex-U soot.

Figure 3:
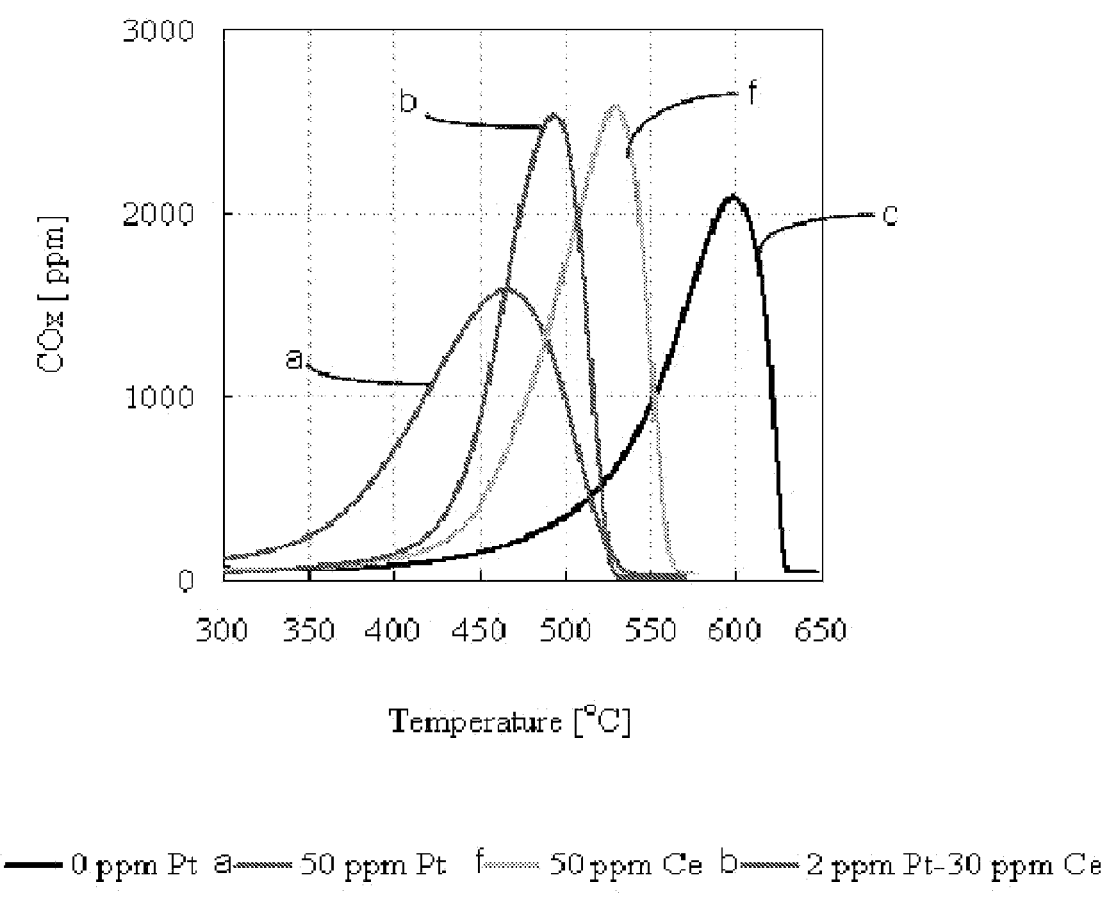
FIG. 3 is a graph of experimental results showing $CO_x$ evolution with temperature during soot oxidation with $NO+O_2$, with increasing oxidation temperature. Reaction conditions: reactor-fixed bed, feed gas –200 ml/min 600 ppm $NO+10$ vol % $O_2+Ar$, heating rate –1° C./min, soot-20 mg.

FIG. 3 shows fuel borne catalyst-soot oxidation during the temperature ramping in the presence of 600 ppm NO+10 vol % $O_2$ in Ar. From the COx evolution profile and normalized soot conversion it is clearly evident that all fuel borne catalysts decreased soot oxidation temperature significantly compared to the uncatalyzed soot oxidation. Among the fuel borne catalysts, the oxidation activity decreased in the order of Pt-soot>Pt—Ce-soot>Ce-soot>un-catalyzed soot oxidation. It is interesting to note that Pt-soot is the least active soot in the presence of $O_2$ alone, compared to Pt—Ce-soot, where as it is significantly superior in the presence of NO. The main oxidant responsible for the decreasing the soot oxidation temperature over Pt-soot is, $NO_2$ generated over Pt crystallites.

Figure 4A:
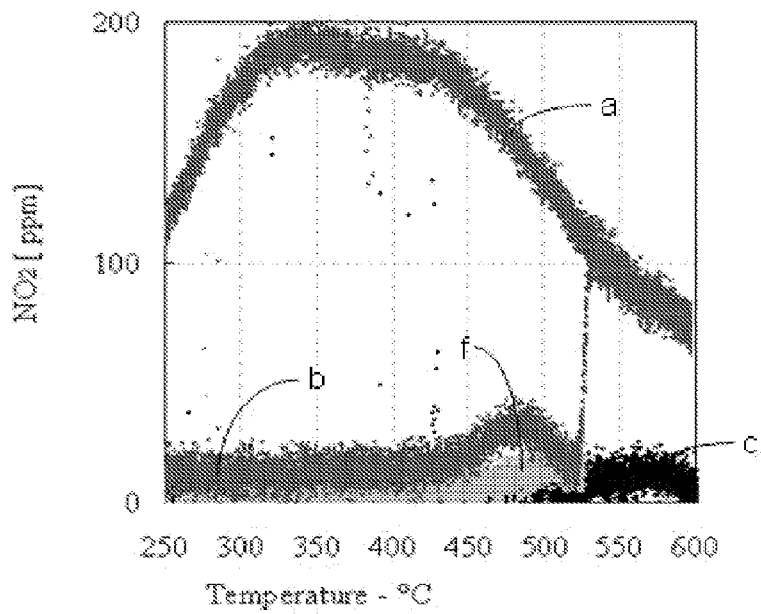
FIG. 4a is a graph of experimental results showing $NO_2$ at the reactor outlet during soot oxidation (FIG. 3)

In the case of Pt—Ce-soot and Ce-soot, though they are capable of generating $NO_2$, it is to a much lesser extent and showed poor performance compared with Pt soot. FIG. 4a shows the $NO_2$ slip during soot oxidation shown in FIG. 3. Pt-soot generated significant amount of $NO_2$ slip compared with Pt—Ce-soot and Ce-soot. It can be expected that Pt—Ce-soot and Ce-soot due to lower NO oxidation rates, the generated $NO_2$ is completely utilized for soot oxidation. This is also evident by the fact that as soon as complete soot is oxidized there is a sudden jump in $NO_2$ signal (around 500° C.), reaching thermodynamic equilibrium over Pt—Ce-soot. $NO_2$ slip trend, in the presence of soot, followed the order Pt-soot>Pt—Ce-soot>Ce-soot>un-catalyzed soot. From $NO_2$ slip comparison it can also be said that Pt—Ce-soot and Ce-soot are less active than Pt-soot in NO oxidation to $NO_2$ but the generated $NO_2$ is more efficiently utilized in soot oxidation over the former catalysts. The observed extent of NO conversion to $NO_2$ is also expected to be influenced by the presence of $Ce_2(SO_4)_3$ phase, which decreased the oxidation ability.

Figure 4B:
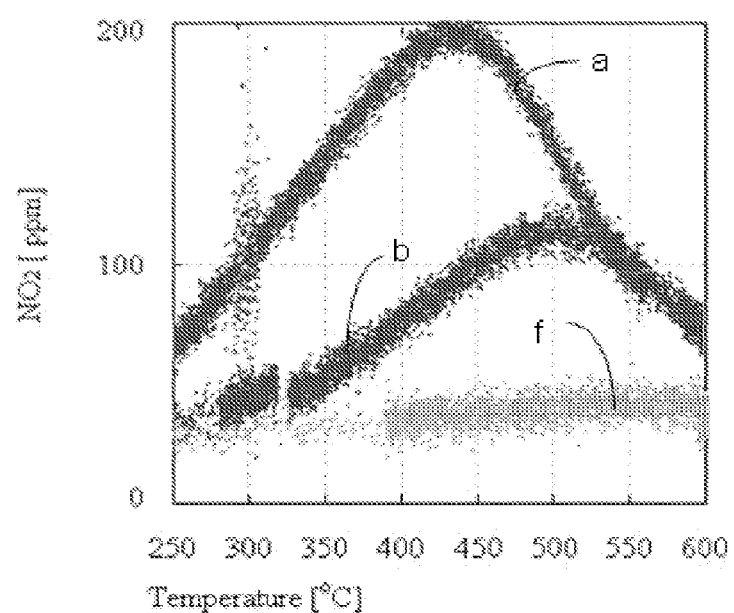
FIG. 4b is a graph of experimental results showing $NO_2$ at the outlet after soot oxidation while cooling. Reaction conditions: reactor-fixed bed, feed gas –200 ml/min 600 ppm $NO+10$ vol % O2+Ar, heating rate –1° C./min, soot-20 mg. $NO_2$ is=inlet–out let reactor NO concentrations measured by NDIR.

The fuel borne catalysts were exposed to 650° C. during soot oxidation experiment, before NO oxidation to $NO_2$ (FIG. 4b) was carried out over fuel borne catalysts during the cooling stage after temperature ramping experiment (FIG. 3). Based on $NO_2$ slip (FIG. 4a) it was expected that Pt will be more active for NO conversion to $NO_2$ in the absence of soot compared to the presence of soot (before complete soot oxidation), however it was less active below 400° C. (above which thermodynamics will strongly governs the oxidation activity). Despite the fact that, fuel borne Pt catalyst was not having any sulfate phases, which could potentially decrease the NO conversion to $NO_2$, the catalyst is relatively less active compared with $NO_2$ slip over Pt-soot. On the other hand NO oxidation activity over Pt—Ce fuel borne catalysts is clearly higher than that of $NO_2$ slip on the respective catalysts in the presence of soot.

Ce alone as a fuel borne catalyst did not show significant oxidation activity and is least active among the fuel borne catalysts studied. All fuel borne catalysts have shown significantly less activity than thermodynamic equilibrium. The observed NO oxidation trends over fuel borne catalysts can be attributed to the fact that, the amount of fuel borne catalyst left after complete soot oxidation, from the mixture of 20 mg fuel borne catalyst-soot+400 mg of SiC is very small (between 0.5-1 mg). Because of such a low amount, the thermodynamic equilibrium was never reached below 450° C. Further more Pt alone as fuel borne catalyst sinter extensively after complete soot oxidation, as it is un-supported, compared with Pt—Ce where $CeO_2$ stabilized Pt crystallites. On the other hand Ce component alone is not very active for NO oxidation to $NO_2$. Based on NO oxidation studies is suggested that the main function of Ce component in Pt—Ce-soot is to stabilize Pt crystallites, which mainly converts NO to $NO_2$ resulting improved soot oxidation.

Figure 5A:
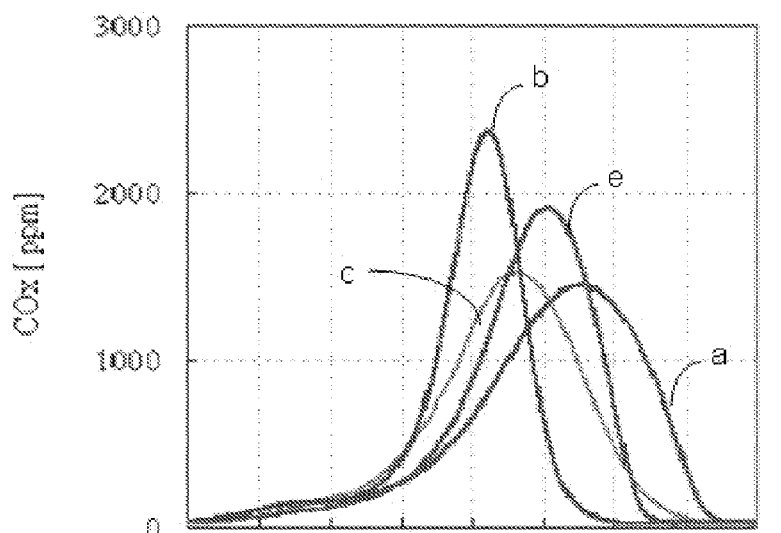
FIG. 5a is a graph of experimental results showing $CO_x$ at the reactor outlet with increasing temperature during soot oxidation with $NO+O_2+Pt/Al_2O_3$.
Figure 5B:
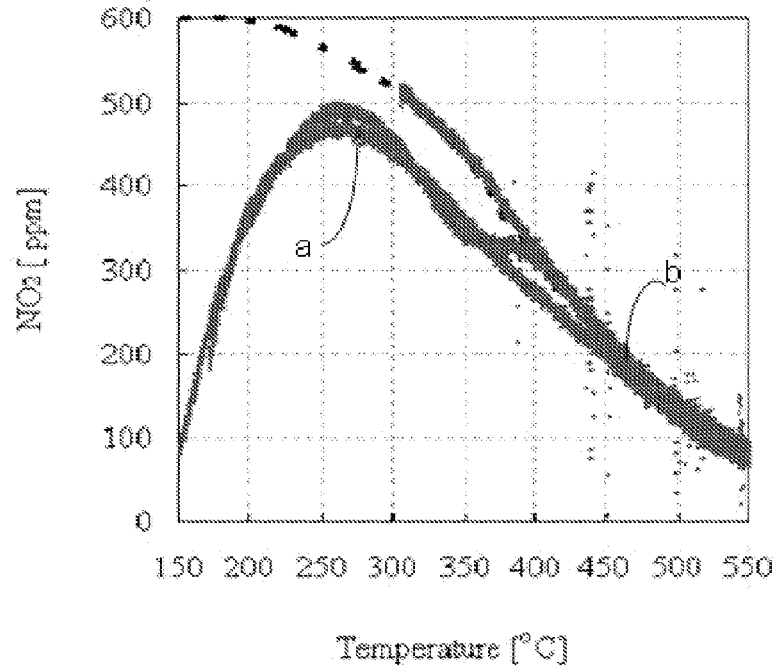
FIG. 5b is a graph of experimental results showing $NO_2$ at the reactor outlet with increasing temperature during soot oxidation with $NO+O_2+Pt/Al_2O_3$. Reaction conditions: reactor-fixed bed, feed gas –200 ml/min 600 ppm $NO+10$ vol % $O_2+Ar$, heating rate –1° C./min. Soot (20 mg) and $Pt/Al_2O_3$ (80 mg) are mixed with a spatula.

FIG. 5 shows oxidation of fuel borne catalyst-soot samples after addition of 2.5 wt % $Pt/Al_2O_3$, in the presence of 600 ppm NO+10 vol % $O_2$ in Ar. The function of $Pt/Al_2O_3$ is to oxidize NO to $NO_2$ during the soot oxidation temperature ramping. A completely different trend of soot oxidation activity is observed compared to oxidation in the presence of $NO+O_2$ or $O_2$. Because $Pt/Al_2O_3$ is mixed (loose contact) with fuel borne catalyst-soot (both fine powders) in a single bed, a continuous supply of $NO_2$ can be ensured for soot oxidation, and will eliminate $NO_2$ dependence on fuel borne catalyst. A very different soot oxidation trend, compared with FIG. 3, shows that either the morphology of soot or fuel borne catalyst sill has a significant influence on soot oxidation rates. Pt—Ce-soot is shown to be oxidized around 300° C. by Jelles et al. (See S. J. Jelles, M. Makkee, J. A. Moulijn, Topics in Catalysis 16 (2001) 269), in the presence of slightly catalyzed trap or by premixing the Pt—Ce-soot with $Pt/Al_2O_3$. Even Printex-U soot and Fe-soot are much more easily oxidizable compared with Pt-soot in the presence of $Pt/Al_2O_3$. NO oxidation to $NO_2$ during and after soot oxidation over selected fuel borne catalysts are shown in FIG. 5b. Significant differences are not found in $NO_2$ slip between different combinations of fuel borne catalyst-soot-$Pt/Al_2O_3$ mixtures, as $Pt/Al_2O_3$ determines most of the activity. In the presence of $Pt/Al_2O_3$ the soot oxidation trend is in the following order, Pt—Ce-soot>printex-U soot>Fe-soot>Pt-soot.

Figure 6A:
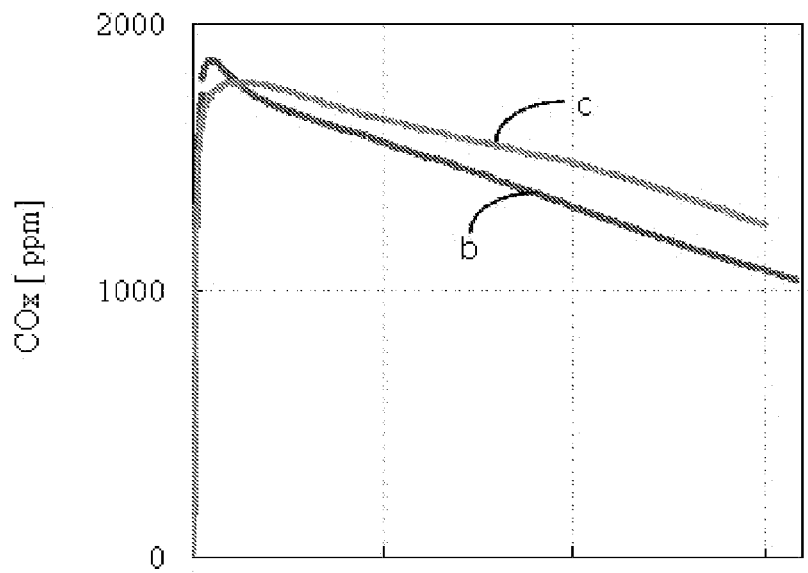
FIG. 6a is a graph of experimental results showing $CO_x$ over Pt—Ce-soot and printex-U soot
Figure 6B:
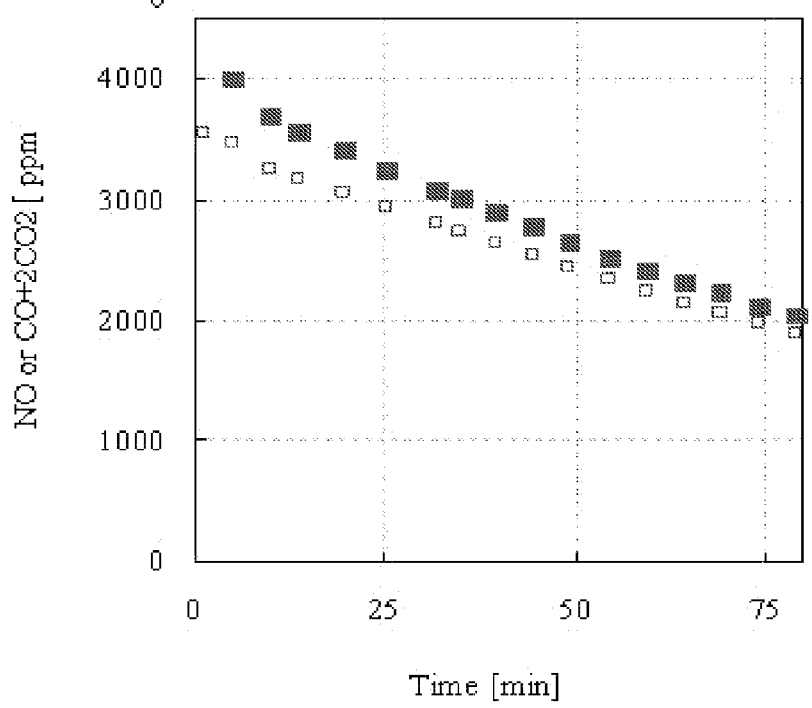
FIG. 6b is a graph of experimental results showing oxygen mass balance (NO and $2CO_2+CO$) over Pt—Ce-soot during isothermal soot oxidation with $NO_2$ at 350° C. Reaction conditions: reactor-fixed bed, feed gas –200 ml/min 5000 ppm $NO_2+Ar$, soot-20 mg.
Figure 7:
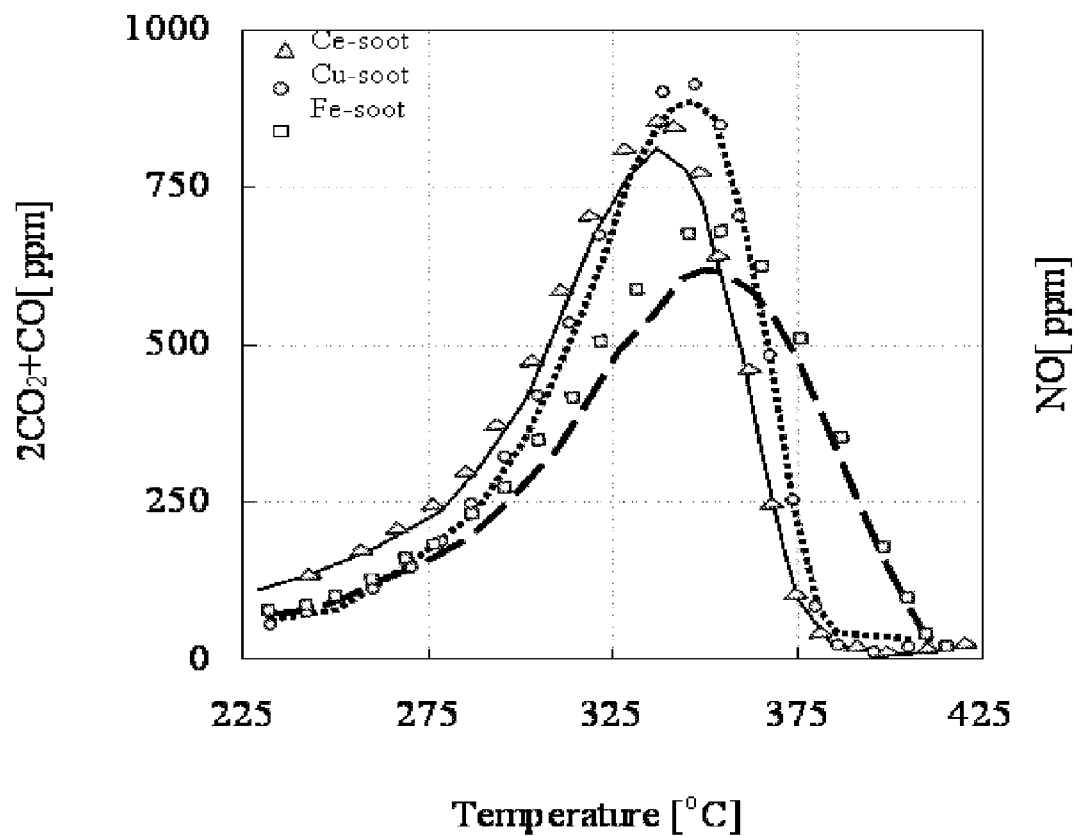
FIG. 7 is a graph showing Catalyst-soot oxidation with $NO_2$ with increasing temperature with $NO_2$. Reaction conditions: reactor-fixed bed, feed gas –200 ml/min 2500 ppm $NO_2+Ar$, heating rate –0.2° C./min, soot-20 mg.

FIG. 6a shows soot oxidation activity in the presence of 5000 ppm $NO_2$ at 350° C. over Pt—Ce-soot and printex-U soot. Both the soot samples have shown similar oxidation activity as evident from the similar $CO_x$ concentration level at the reactor outlet. FIG. 6b shows oxygen mass balance during the reaction over Pt—Ce-soot. The oxygen mass balance between $CO_2$+CO at the reactor out let is similar to NO concentration at the reactor outlet, therefore it can be concluded that the entire $CO_x$ is arising from $NO_2$. FIG. 7 shows temperature ramping experiments over fuel borne catalyst-soot samples with $NO_2$, taken from the thesis of Jelles (See S. J. Jelles, (1999)). Ce-soot and Cu-soot have shown similar activity with reduced activity over Fe-soot. From the above isothermal and ramping experiments it can be argued that, if $NO_2$ is the only oxidant, fuel borne catalysts does not have a significant role in determining soot oxidation performance. This is in agreement the proposal that $NO_2$ reaction with soot is un-catalyzed (See S. J. Jelles, R. R. Krul, M. Makkee, J. A. Moulijn, Catalysis Today 53 (1999) 623).

Figure 8:
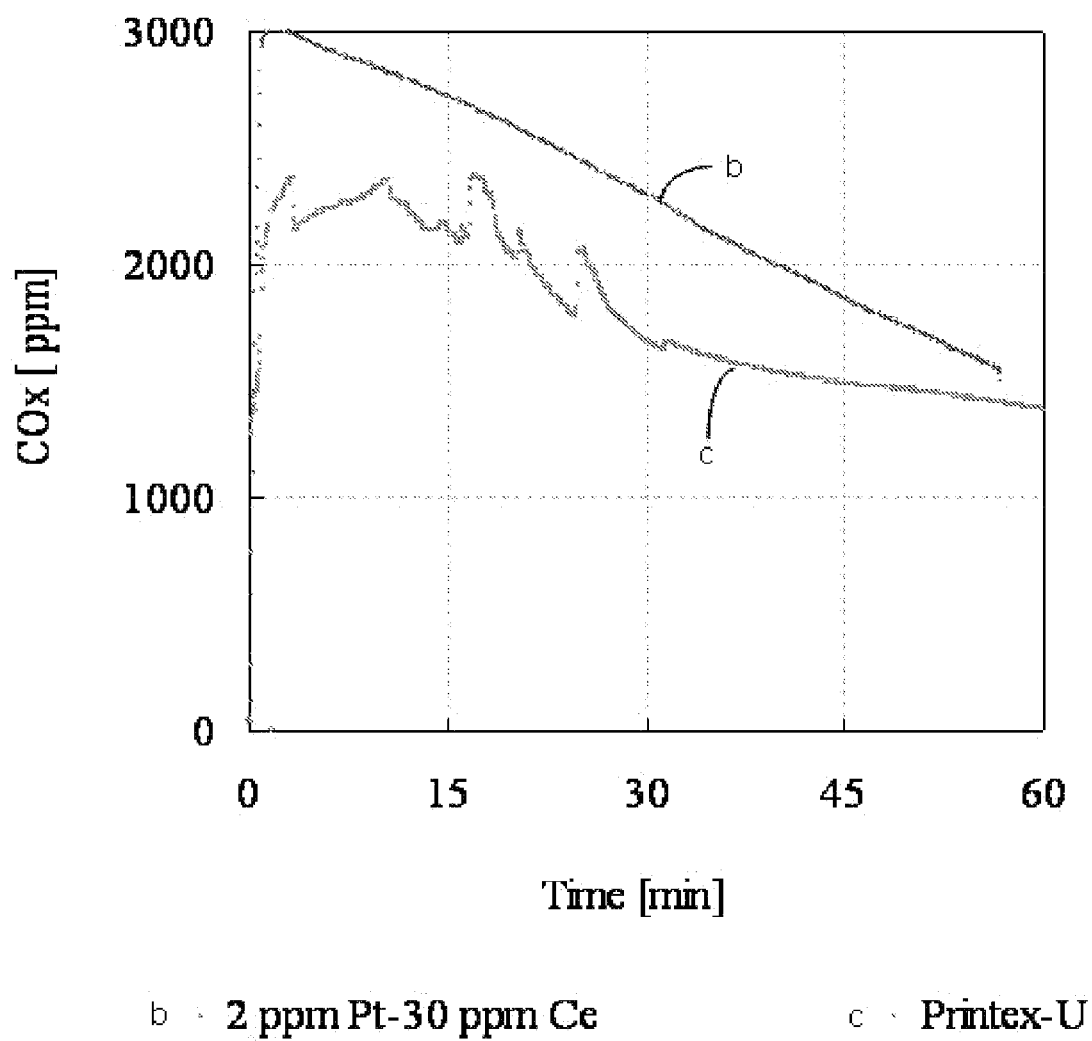
FIG. 8 is a graph showing $CO_x$ over Pt—Ce-soot and printex-U soot during isothermal soot oxidation with $NO_2+O_2$ at 350° C. Reaction conditions: reactor-fixed bed, feed gas –200 ml/min 5000 ppm $NO_2+10$ vol % $O_2+Ar$, soot-20 mg.

FIG. 8 shows soot oxidation with 5000 ppm $NO_2$+10 vol % $O_2$ at 350° C. over Pt—Ce-soot and Printex-U soot. The $CO_x$ concentration at the reactor out let increased over both soot samples compared with oxidation using $NO_2$ alone. This is consistent with literature reports that oxygen is able to react with soot, in the presence of $NO_2$ (See F. Jacquot, V. Logie, J. F. Brilhac, P. Gilot, Carbon 40 (2002) 335; and A. Setiabudi, M. Makkee, J. A. Moulijn, Applied Catalysis B-Environmental 50 (2004) 185). Apart from this Pt—Ce— can catalyze soot oxidation to some extant using $O_2$ alone as an oxidant. However the extant of increase cannot be explained based on either NO recycle to $NO_2$ and direct soot oxidation with $O_2$ catalyzed by Ce component.

Figure 9A:
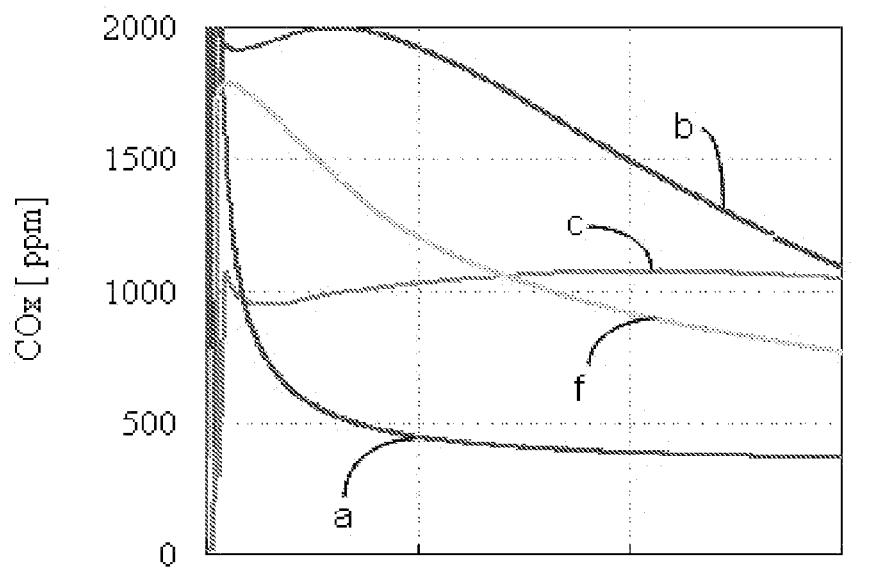
FIG. 9a is a graph showing $CO_x$.
Figure 9B:
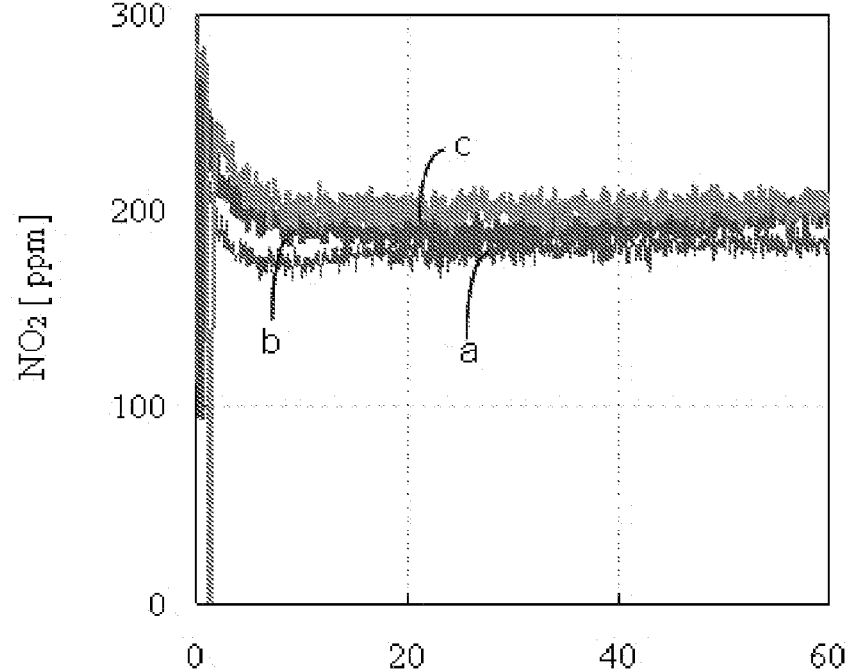
FIG. 9b is a graph showing NO at the reactor during Pt—Ce-soot and printex-U soot oxidation with 300 ppm $NO+O_2$ at 350° C. Reaction conditions: reactor-fixed bed, feed gas –200 ml/min 300 ppm $NO_2+10$ vol % $O_2+Ar$, soot-20 mg.

FIG. 9 shows oxidation of soot mixed with $Pt/Al_2O_3$ at 350° C. in the presence of $NO+O_2$ in the feed gas. Pt—Ce-soot has shown significantly higher soot oxidation activity compared with the rest of the soot samples, despite similar or more amount of fuel borne catalyst present in Pt-soot and Ce-soot samples. There are very small differences in the NO concentration at the outlet of the reactor, as all the catalyst-soot samples had $Pt/Al_2O_3$ externally added. Various possibilities should be considered to explain the superior performance of Pt—Ce-soot and Ce-soot. i) The main oxidant for the oxidation of different soot samples is $NO_2$, ii) $NO_2$ is mainly produced over $Pt/Al_2O_3$ and fuel embedded catalyst has very small influence on $NO_2$ production, iii) so NO recycle over Pt—Ce-soot as a reason for improved activity can be ruled out, as all the fuel borne catalyst-soot compositions have this ability to produce $NO_2$ from externally added $Pt/Al_2O_3$ catalyst. If at all this is an important step than Pt-soot should show much higher soot oxidation activity.

The superior oxidation performance of Pt—Ce-soot and Ce-soot is only observed in the presence of excess $NO_2+O_2$ or $NO+O_2+Pt/Al_2O_3$. In order to explain such a behaviour especially in the presence of $Pt/Al_2O_3$ catalyst Jelles et al. [6,8] have proposed that, ceria catalyses soot oxidation by $NO_2$ (apart from direct soot oxidation with $NO_2$). $NO_2$ decomposes over $CeO_2$ to NO and adsorbed 'O*' on $CeO_2$ surface and the adsorbed O* efficiently oxidizes soot. If the above mechanism is operating, than Pt—Ce-soot could have shown superior activity compared with other fuel borne catalyst-soot samples, in the experiments with $NO_2$ alone, which is not the case. There fore there should be other mechanistic routes of soot oxidation to explain superior performance of Pt—Ce-soot in the presence of $NO_2+O_2$ or $NO+O_2+Pt/Al_2O_3$. Under the different feed gas conditions used, apart from the known gas phase species the formation of surface nitrates on ceria is taking place, and nitrate is a very powerful oxidant in soot oxidation. Because ceria is in tight contact with soot, the transfer of these surface nitrates to soot surface should be efficient leading to very efficient system, such as Pt—Ce fuel borne catalyst.

Figures 10A, 10B:
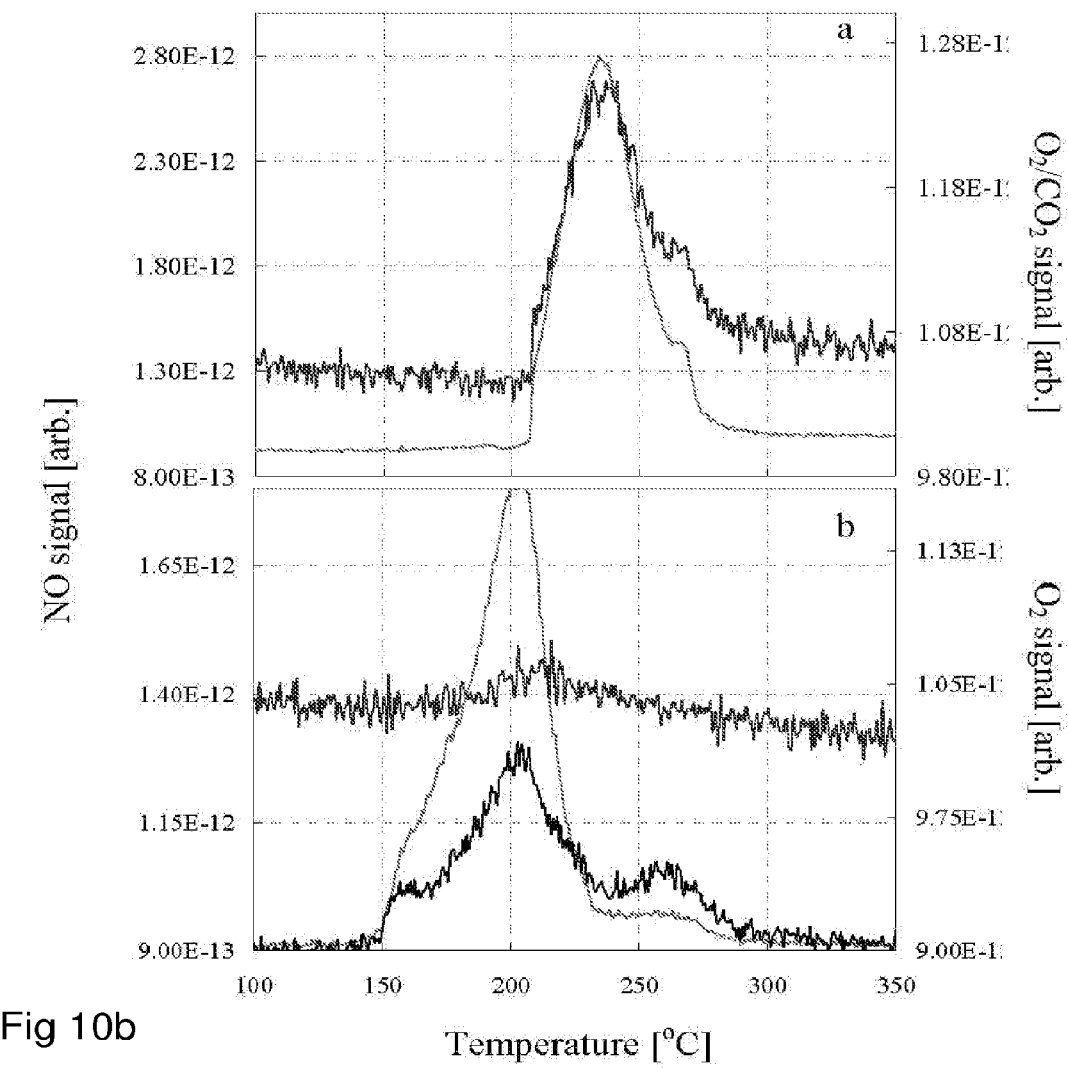
FIG. 10a is a graph showing MS analysis of $Ce(NO_3)_3$.
FIG. 10b is a graph showing $Ce(NO_3)_3$+prinetx-U soot decomposition in He. Reaction conditions: reactor-DRIFT cell connected to MS, feed gas –20 ml/min He, $Ce(NO_3)_3$+ soot were ground in a mortar.
Figure 11:
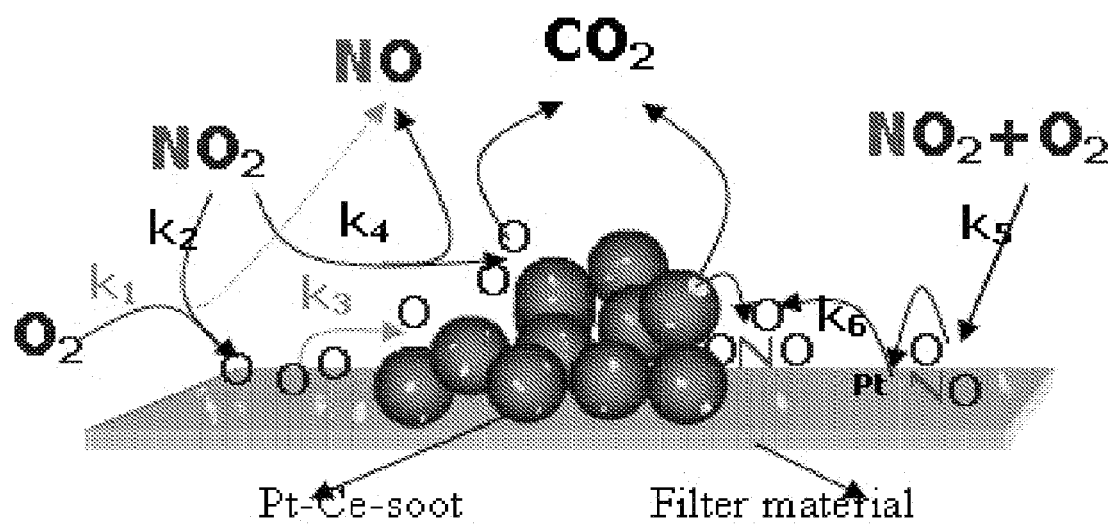

FIG. 10 shows $Ce(NO_3)_3$ and $Ce(NO_3)_3$+soot (4:1 tight contact mixture) decomposed in He in a DRIFT cell connected to MS. Cerium nitrate precursor decomposition alone gives $NO_2+O_2(2Ce(NO_3)_3 \rightarrow 2CeO_2+6NO_2+O_2)$ (FIG. 10a). In the presence of soot, cerium nitrate decomposed at lower temperature, due to its reaction with soot, and no oxygen is observed (FIG. 10b). The absence of oxygen clearly indicates that nitrate is a primary reactant at these low temperatures, around 200° C.

Discussion of Results

Uncatalyzed and catalyzed soot oxidation has been studied extensively over various materials working on very different principles (See B. A. A. L. van Setten, M. Makkee, J. A. Moulijn, Catal. Rev. Sci. Eng. 43 (2001) 489). For example, i) uncatalyzed soot oxidation with $O_2$ by directly injecting fuel to increase the temperature above 600° C., ii) soot oxidation over Pt/supported catalysts where soot is mainly oxidized by $NO_2$ (around 300° C.), generated over Pt from NO in the diesel exhaust gases, iii) molten salt catalysts, where significant contact between soot and catalyst can be generated leading to soot oxidation with $O_2$, iv) oxidation assisted by plasma and v) fuel borne catalysts, where catalyst is embedded inside the primary soot particles thus having significant contact. Among all these technologies, the most viable are Pt/support catalyzed soot traps and fuel borne catalysts, which are currently employed in the aftertreatment systems. The mechanistic aspects of soot oxidation, over Pt/support type after treatment systems are straightforward and there is plenty of reported literature. The main oxidation function arises from Pt crystallites, on which exhaust gas NO is oxidized to $NO_2$, which further reacts with soot around 300° C. As NO conversion to $NO_2$ is both thermodynamically and kinetically controlled, excess NO in the exhaust gas is necessary compared with soot (soot/NO>20) in order to realize significant soot oxidation around 300° C. (See Kimura, K, Alleman, T, L, Chatterjee, S, Hallstrom, K, SAE paper 2004-01-0079, Detroit 2004; and R. Allensson, Goersmann, Cavenius, Phillips, Uusimak, A. J, A. P. Walker, SAE paper 2004-01-0072, Detroit 2004). The main disadvantages of catalyzed soot traps arise from their durability and resistance to $SO_3$ poisoning, especially when used in heavy-duty applications (which demands very long durability under the conditions of significant amounts of $SO_2$).

Fuel borne catalysts in this respect have advantages as durability of the catalyst is not an issue, and $SO_2$ is found to have very small influence compared with catalysed soot traps (See T. Campenon, P. Wouters, G. Blanchard, P. Macaudiere, T. Seguelong, SAE paper 2004-01-0071, Detroit 2004; and S. J. Jelles, R. R. Krul, M. Makkee, J. A. Moulijn, G. J. K. Acres, J. D. Peter-Hoblyn, SAE 1999-01-0113). Though fuel borne catalysts have been studied for the past two decades, not many mechanistic aspects on how the soot is oxidized over these catalysts is not thoroughly studied. It is assumed that the oxygen storage capacity of ceria is capable of providing locally the necessary active species for soot oxidation (See T. Campenon, P. Wouters, G. Blanchard, P. Macaudiere, T. Seguelong, SAE paper 2004-01-0071, Detroit 2004; and D. Bianchi, E. Jean, A. Ristori, R. Vonarb, Energy Fuels 19 (2005) 1453). However not many reaction/characterization studies are known to correlate different catalyst surface properties with the soot oxidation activity, especially in the presence of $NO+O_2$.

Based on the engine experiments and the conventional laboratory experiments, it was shown that ultra low dosage of Pt—Ce fuel additive will lead to lowest balance point, partly due to highly reactive Pt—Ce-soot (See S. J. Jelles, R. R. Krul, M. Makkee, J. A. Moulijn, Catalysis Today 53 (1999) 623; S. J. Jelles, R. R. Krul, M. Makkee, J. A. Moulijn, G. J. K. Acres, J. D. Peter-Hoblyn, SAE 1999-01-0113; and B. A. A. L. van Setten, M. Makkee, J. A. Moulijn, Catal. Rev. Sci. Eng. 43 (2001) 489). The fuel borne catalyst-soot samples (Table 1), except Pt-soot, are generated with fuel containing 500 ppm of sulfur. However these catalysts are never characterized. In the present investigation, the soot samples generated by Jelles et al. (See S. J. Jelles, R. R. Krul, M. Makkee, J. A. Moulijn, Catalysis Today 53 (1999) 623; S. J. Jelles, R. R. Krul, M. Makkee, J. A. Moulijn, G. J. K. Acres, J. D. Peter-Hoblyn, SAE 1999-01-0113; and B. A. A. L. van Setten, M. Makkee, J. A. Moulijn, Catal. Rev. Sci. Eng. 43 (2001) 489), were used for characterization and oxidation studies. In the current experiments, in general, >85% carbon mass balance could be accounted, the un accounted carbon mass balance could be due to the fuel borne catalyst and oxygen of SOCs, indicate that the nature of soot did not change significantly on storage. In the present study, soot containing different fuel borne catalysts (Pt, Ce, Pt—Ce, Fe and Cu) are investigated and the reasons for the possible superior activity of Pt—Ce-soot compared with other catalyst-soot samples are explained by different active species in gas phase or on fuel borne catalyst.

X-ray diffractograms of all soot samples essentially showed similar features (FIG. 1). The slightly increased intensity and shift of diffraction peak of Pt-soot to higher 2θ points out more graphitic crystallite domains in the Pt-soot. Large Pt crystallites are observed in Pt-soot and $Ce_2(SO_4)_3$ and $CeO_2$ phases are observed in Pt—Ce-soot. No XRD observable Pt crystallites are detected in Pt—Ce-soot due to ultra low dosage of Pt additive (2 ppm). Though Ce-soot is not characterized by XRD, it can be expected to contain $Ce_2(SO_4)_3$ phases as well as $CeO_2$. No major changes of cerium sulfate phases are observed even in 70% oxidized Pt—Ce-soot. Retailleau et al. (See L. Retailleau, R. Vonarb, V. Perrichon, E. Jean, D. Bianchi, Energy Fuels 18 (2004) 872) have observed the decomposition of cerium sulfate as an important step, forming new phases which can activate oxygen, in soot oxidation. However such a significant transformation of cerium sulfate is not evident in the present study and the $Ce_2(SO_4)_3$ phases can be considered as inactive phase in soot oxidation experiments. It was shown that the surface lattice oxygen of $CeO_2$ is involved in soot oxidation (See A. Bueno-Lopez, K. Krishna, M. Makkee, J. A. Moulijn, J. Catal. 230 (2005) 237). $CeO_2$ supplies the lattice oxygen efficiently to soot creating oxygen vacancies, which are quickly filled, by gas phase oxygen and further driving the soot oxidation.

It is also important to notice that, even in the 70% oxidized Pt—Ce-soot, relatively significant diffractions due to graphitic sheets are observed (FIG. 1b). This indicates that the soot burning is first taking place on amorphous mass in the soot particle, followed by the consumption of the graphitic sheets. Which also suggests that the oxidation model may not follow shrinking core formalism (See B. R. Stanmore, J. F. Brilhac, P. Gilot, Carbon 39 (2001) 2247; and A. Messerer, R. Niessner, U. Poschl, Carbon 44 (2006) 307). This observation also indicates that during soot oxidation of fuel borne catalyst-soot, if any of the catalyst particles are buried inside the primary particle, with progressive soot oxidation these particles are exposed and could potentially increase the oxidation rate.

Using $O_2$ as an oxidant, the soot oxidation activity decreased in the following trend, Fe-soot<Pt—Ce-soot<Pt-soot<Ce-soot (FIG. 2). Considering, majority of the fuel borne catalyst is present as cerium sulfate, it can be said that Pt is significantly less active compared with ceria-soot samples. On the other hand in the presence of $NO+O_2$, Pt-catalysts are significantly more active (FIG. 3a). The improved soot oxidation activity is obviously due to superior NO oxidation to $NO_2$ over Pt-soot (FIG. 4a), which further oxidizes soot to $CO_2$. Ce-soot is least active and Pt—Ce-soot (considering low dosage of fuel borne additive, 2 ppm Pt-30 ppm Ce) has shown moderate activity. The higher NO oxidation to $NO_2$ in the presence of soot, compared with lower NO oxidation activity to $NO_2$ in the absence of soot over Pt, it can be concluded that Pt is sintering in the absence of support after soot oxidation. On the other hand, the function of Ce in Pt—Ce-soot seems to stabilize Pt crystallites towards sintering.

An improved soot oxidation activity with time is observed in the engine experiments (See B. A. A. L. van Setten, M. Makkee, J. A. Moulijn, Catal. Rev. Sci. Eng. 43 (2001) 489).

The significant improvement is only observed after running engine for some time on Pt—Ce-fuel additive (induction period) and the superior performance of Pt—Ce— is suggested due to platinum, which is deposited on the monolith during the induction period, which started to catalyze the oxidation of NO to $NO_2$. Based on the above arguments it can be suggested that, the Pt—Ce combination will have significantly higher impact in increasing the soot oxidation rate compared to Pt alone, which can be expected to extensively sinter, there by decreasing NO to $NO_2$ oxidation and soot oxidation with $NO_2$.

When fuel borne catalyst-soot is mixed with $Pt/Al_2O_3$ and soot oxidation is carried out with $NO+O_2$, Pt—Ce-soot is more reactive compared with all other soot samples (FIG. 5). The main function of $Pt/Al_2O_3$ is to recycle NO to $NO_2$, as $NO_2$ is consumed in soot oxidation. The observed differences in soot oxidation activity under these conditions cannot be explained based on the different extents of NO oxidation to $NO_2$. If NO oxidation to $NO_2$ is the main reactant, than Pt-soot+$Pt/Al_2O_3$ is expected to show higher soot oxidation activity.

The enhanced soot oxidation over Pt—Ce-soot therefore should be either due to different nature of soot or due to fuel borne Pt—Ce catalyst. It was proposed that Pt/Ce activated soot and supported platinum catalyst are important elements of the low temperature soot oxidation system and the suggested explanation of observed results is that, $NO_2$ formed on the supported platinum catalyst, will decompose to give NO and adsorbed 'O' on Pt—Ce catalyst, and such an oxygen is responsible for the high soot oxidation activity (See S. J. Jelles, R. R. Krul, M. Makkee, J. A. Moulijn, Catalysis Today 53 (1999) 623; and S. J. Jelles, R. R. Krul, M. Makkee, J. A. Moulijn, G. J. K. Acres, J. D. Peter-Hoblyn, SAE 1999-01-0113). However all the soot samples have shown similar activity in the presence of $NO_2$ alone (FIG. 6 and FIG. 7). If Pt—Ce is catalyzing soot oxidation with $NO_2$, Pt—Ce-soot is expected to show significantly higher soot oxidation activity with $NO_2$. Significant superior activity over Pt—Ce-soot is only observed with $NO_2$ in the presence of $O_2$ (FIG. 8) or $NO+O_2+Pt/Al_2O_3$ (FIG. 9) are present. Even Ce-soot is more reactive compared with Pt-soot in the presence of $NO+O_2+Pt/Al_2O_3$ (FIG. 9). It can be expected that the main reaction, that takes place under these reaction conditions is the formation of surface nitrates over ceria. These nitrates are found to oxidize soot at very low temperatures (even below 300° C.) in comparison with gas-phase $NO_2$ (FIG. 10). Though $CeO_2$ alone is capable of forming surface nitrates, combination of Pt and Ce shows synergetic effect and seems to improve the rate of such nitrate formation and its migration to the soot surface. The surface nitrate formation and its subsequent migration to soot surface will dramatically increase the soot oxidation rate. On the other hand Fe—, Cu— and Pt— fuel borne catalysts do not form extensive surface nitrates and the main reactions over these catalysts are the direct soot oxidation with $NO_2$ and $O_2$. These oxidations are less effective compared with decomposition of cerium nitrates.

Based on the experimental results, the different reactions that are important for soot oxidation are summarized in Scheme 1. It can be concluded that the oxidation activity of the species with decreasing order is: 1) nitrates, $NO_3^-$, 2) $NO_2$, 3) lattice oxygen, and 4) gas-phase oxygen. From the present study and that of Jelles et al. [6-8] the hypothesis is formulated that all possible oxidation species present in the exhaust gas and on the catalyst surface (Scheme 1) can be efficiently utilized in Pt—Ce-soot oxidation in comparison with any of the known catalytic system. Furthermore Pt in the ultimately formed Pt—Ce residue is stabilized, no Pt sintering, and with ageing of the trap the accumulated Pt—Ce residue is expected to improve NO conversion to $NO_2$ significantly and further contribute to soot oxidation. The soot oxidation activity is further improved for example by decreasing the sulfur content of Ceria so that most of the ceria could be utilized for soot oxidation through nitrate route, or a variety of new materials that can efficiently form nitrates such as Ba and K in combination with Pt and Ce components improves the soot oxidation activity further.

Conclusions Based on the Experimental Results

Fe—, Pt—Ce— and Ce-soot are oxidized at lower temperature with $O_2$, compared with Pt-soot, and the opposite trend is observed with $NO+O_2$. NO is oxidized to $NO_2$ more efficiently over Pt-soot, where as it is more efficiently utilized over Ce— and Pt—Ce-soot samples. Soot oxidation under different feed gas conditions suggest that, in the presence of $NO_2+O_2$ nitrate species are involved in the oxidation over Ce— and Pt—Ce-soot samples. Different oxidation species with decreasing order of activity which are responsible for fuel borne catalysts, in general, are suggested as 1) nitrates, 2) $NO_2$, 3) lattice oxygen, and 4) gas phase oxygen. All the above species are involved in the oxidation of Pt—Ce-soot, which is the most easily oxidizable soot under practical conditions.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence which is effective to meet the objectives there intended, unless the context specifically indicates the contrary.

The invention claimed is:

1. A method for reducing emissions of particulates from diesel engines, which comprises: operating a diesel engine with a fuel containing a fuel borne catalyst comprising a fuel soluble or dispersible cerium composition and a fuel soluble or dispersible platinum group metal composition; passing exhaust produced by combustion of the fuel and containing both cerium oxide and platinum group metal released from the fuel by combustion, through a diesel particulate filter having at least two stages comprised of
   (a) a catalyst section having a platinum group metal catalyst and/or base metal catalyst on contact surfaces within the catalyst section and
   (b) a filter section comprised of passages effective to remove particulates from a moving stream of combustion gases generated by combusting the fuel in the engine and holding them therein to permit their oxidation,
   wherein the improvement comprises utilizing levels of platinum group metal composition, cerium compositions, fuels and/or optional chemical enhancers to generate $NO_2$ in the catalyst section in amounts sufficient to form cerium nitrates in the filter section whereby the cerium oxide is associated with and maintains dispersion of the platinum in the filter section, and the cerium nitrates will be available at the surface and within the soot particles to provide enhanced soot oxidation at a lower balance point than could be achieved without the provision of the platinum group metal and cerium fuel additive in the multi stage filter.

2. A process according to claim 1 wherein the chemical enhancers are soluble or dispersible alkali metal and/or alkaline earth compositions in the fuel in amounts effective to enhance the most active species of surface nitrates.

3. A process according to claim 1 wherein the chemical enhancers are solid phase alkali metal and/or alkaline earth metal compositions in the device catalyst section (a), and/or the filter section (b).

4. A process according to claim 3 wherein the chemical enhancer is employed in an amount of from about 0.1 to about 1.0 of the weight of the cerium.

5. A process according to claim 1 wherein a third stage filter is employed effective to remove fine and ultra fine particulates.

6. A process according to claim 1 wherein a selective catalytic reduction (SCR) unit, is provided downstream of the diesel particulate filter.

7. A process according to claim 6 wherein a catalyst is provided downstream of the diesel particulate filter to oxidize NO to $NO_2$ to aid in the effectiveness of the SCR unit in reducing residual $NO_x$.

8. A process according to claim 1 wherein the catalyst section of (a) comprises a substrate selected from the group consisting of alumina, a silica-alumina composition such as cordierite, silicon carbide, glass or metal fibers, porous glass, ceramic and metal substrates.

9. A process according to claim 1 wherein the filter section of (b) comprises device selected from the group consisting of wall flow monolith devices of type device known to be useful for particulate traps and wire mesh filters.

10. A process according to claim 1 where the catalyst section is integral with the filter section.

11. A process according to claim 1 wherein fuel is injected into the engine exhaust upstream of the catalyst (a) to raise the temperature within the catalyst and filter sections of the device.

12. A process according to claim 1 wherein a fuel containing fuel borne catalyst is injected into the engine exhaust upstream of the catalyst and filter sections of the device.

13. A process according to claim 2 wherein a fuel containing fuel borne catalyst and enhancer is injected into the engine exhaust upstream of the catalyst and filter sections of the device.

14. A process according to claim 11 wherein the injection of fuel, whether or not containing fuel borne catalyst or enhancer, is controlled based upon temperature or backpressure sensor signals upstream of the catalyst filter device, within the device, and/or downstream of the device.

15. A process according to claim 1 wherein an enhancer for cerium nitrate formation is employed as part of the catalyst section as manufactured.

* * * * *